March 20, 1956  A. G. BODINE, JR  2,738,781
ENGINE DETONATION CONTROL BY ACOUSTIC METHODS AND APPARATUS
Original Filed July 2, 1951  9 Sheets—Sheet 1

INVENTOR.
Albert G. Bodine, Jr.
BY Forrest J. Lilly
Attorney

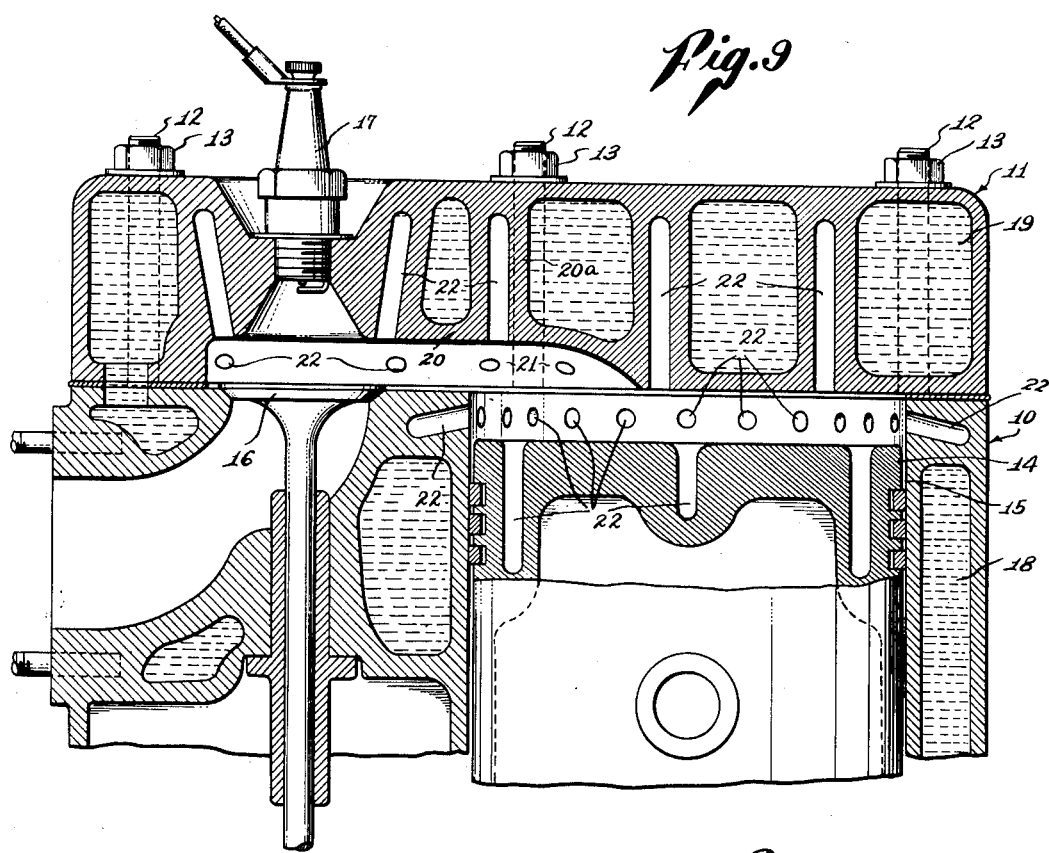
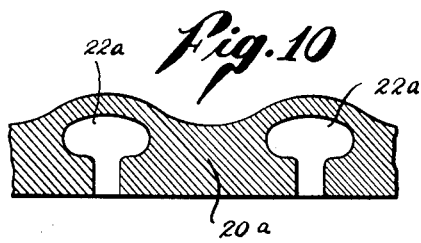
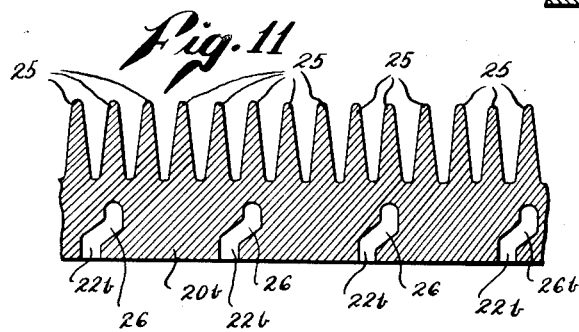

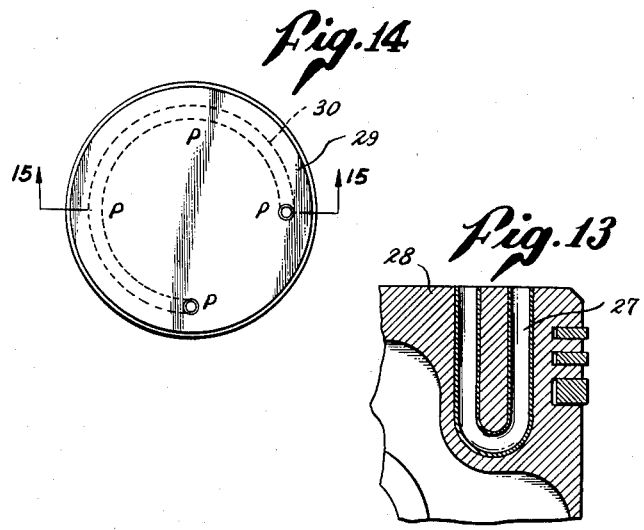
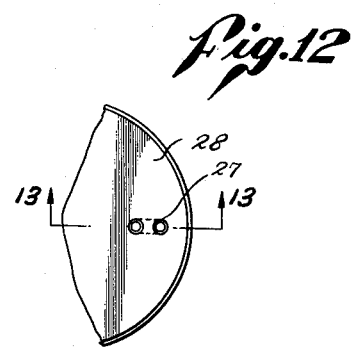
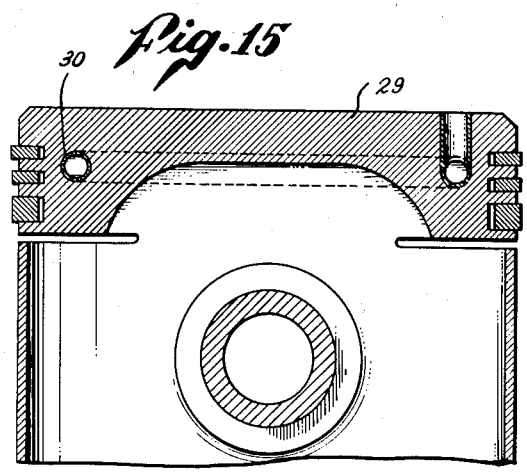
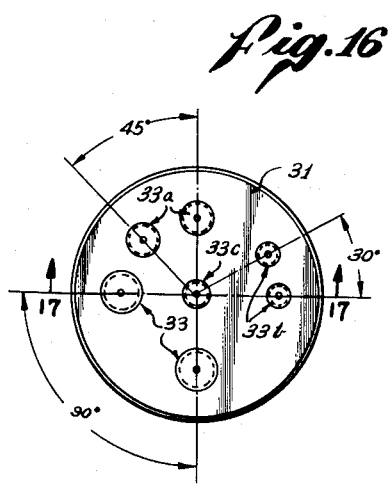
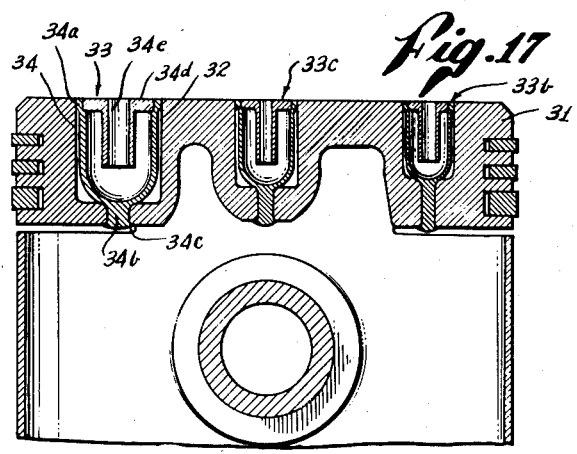

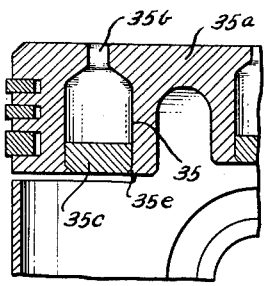
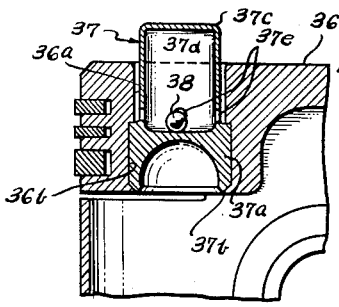
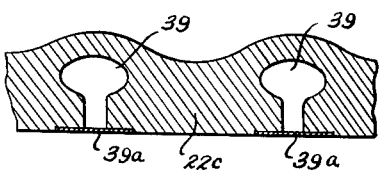
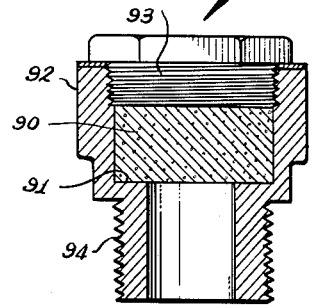
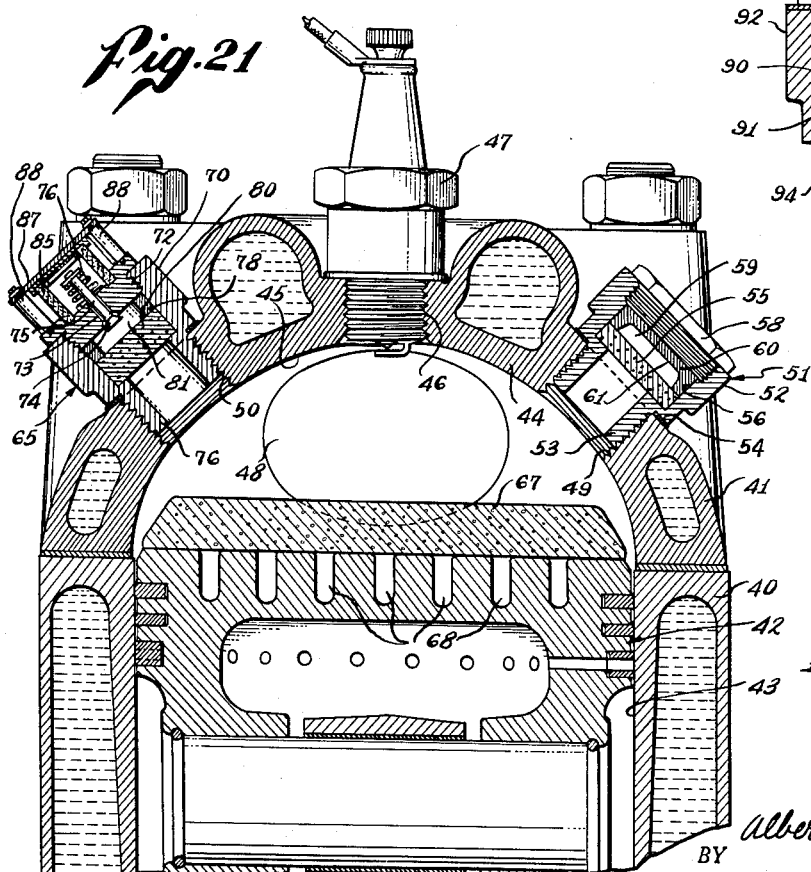
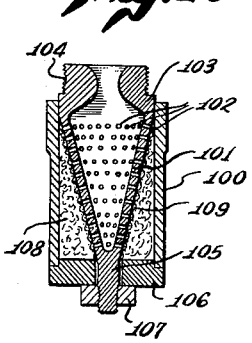

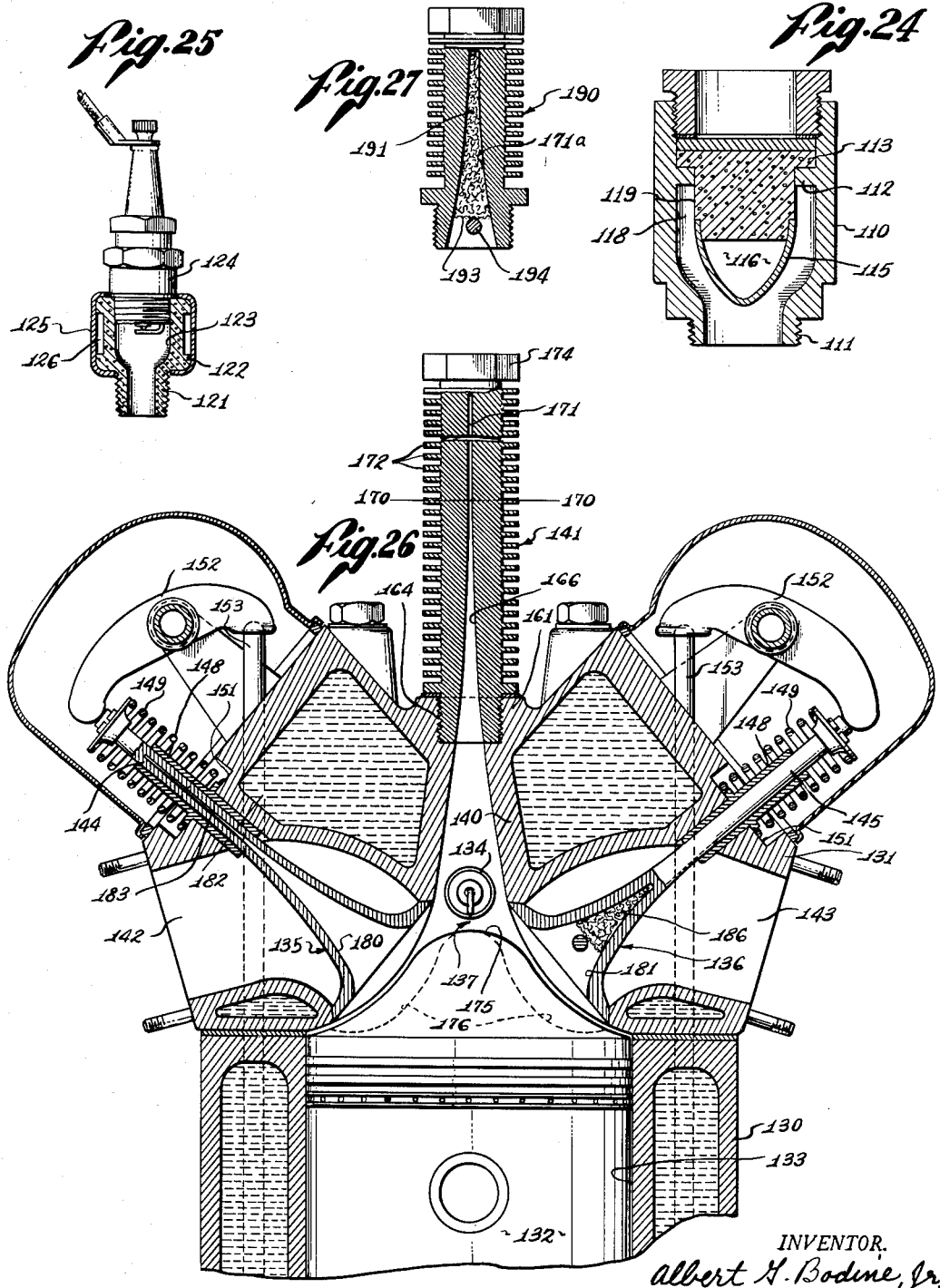

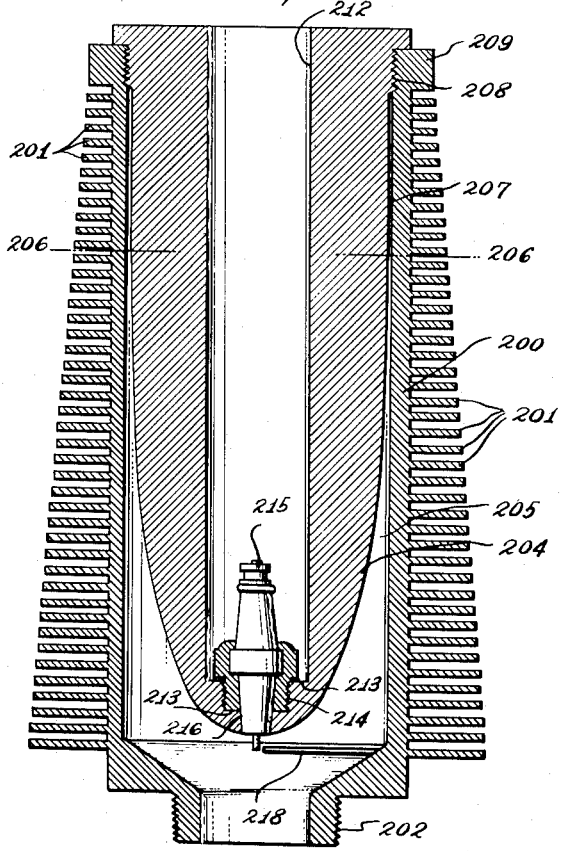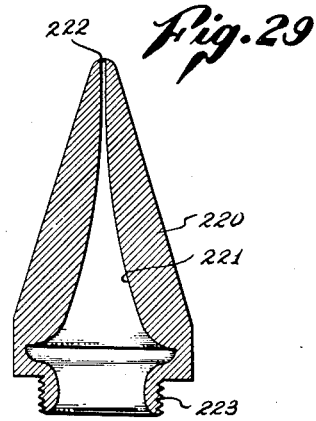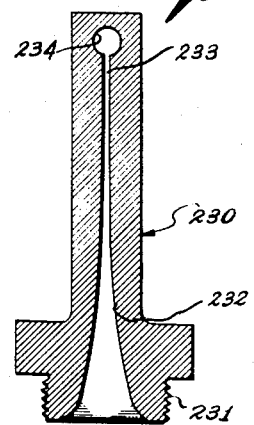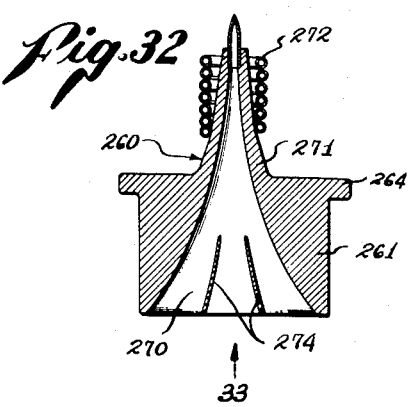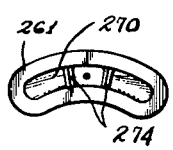

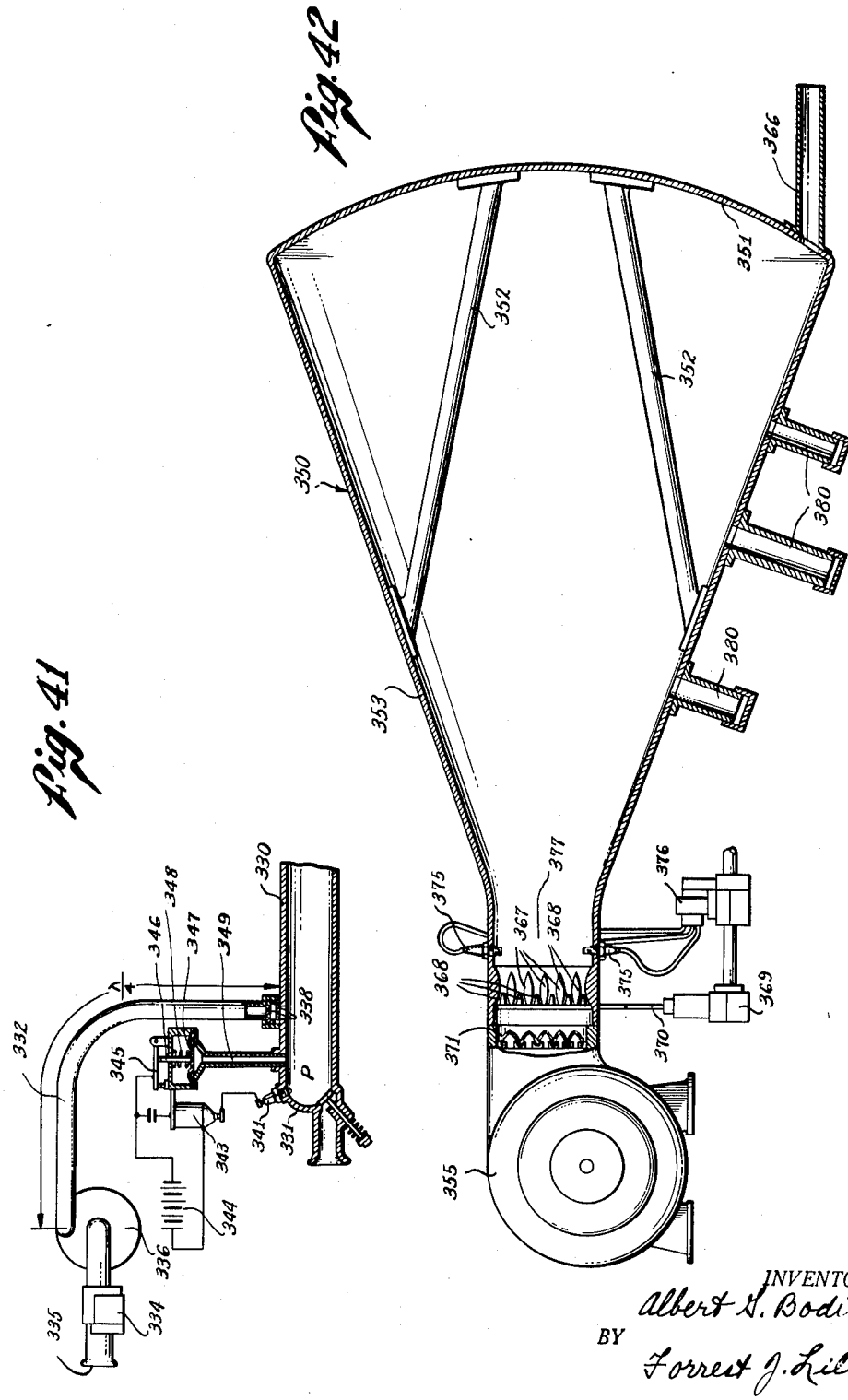

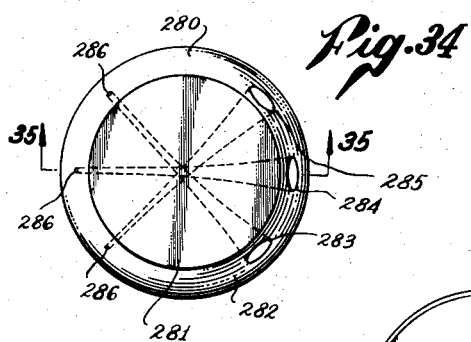
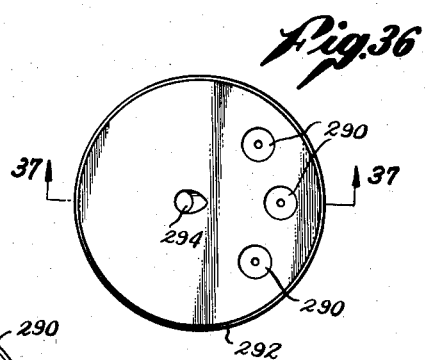
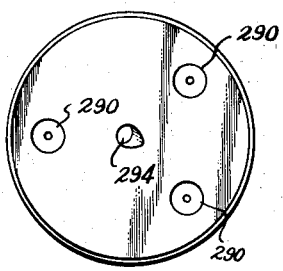
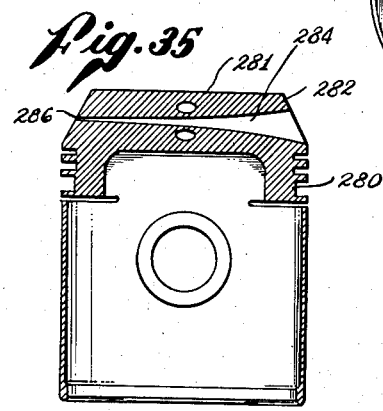
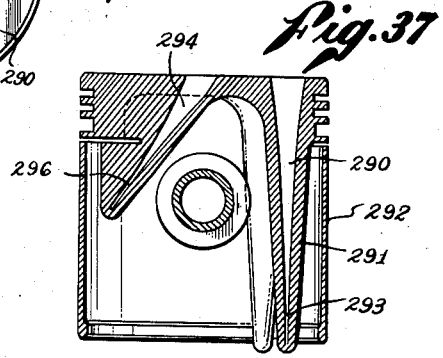
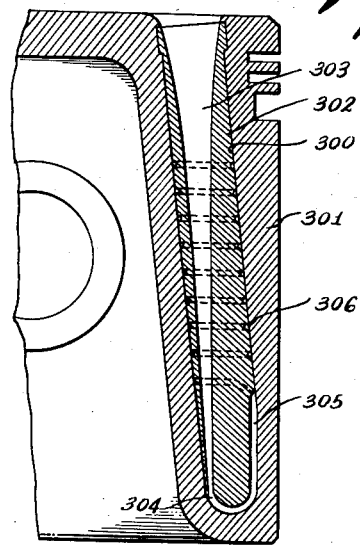
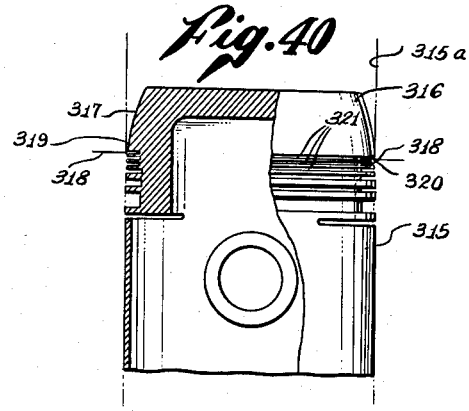

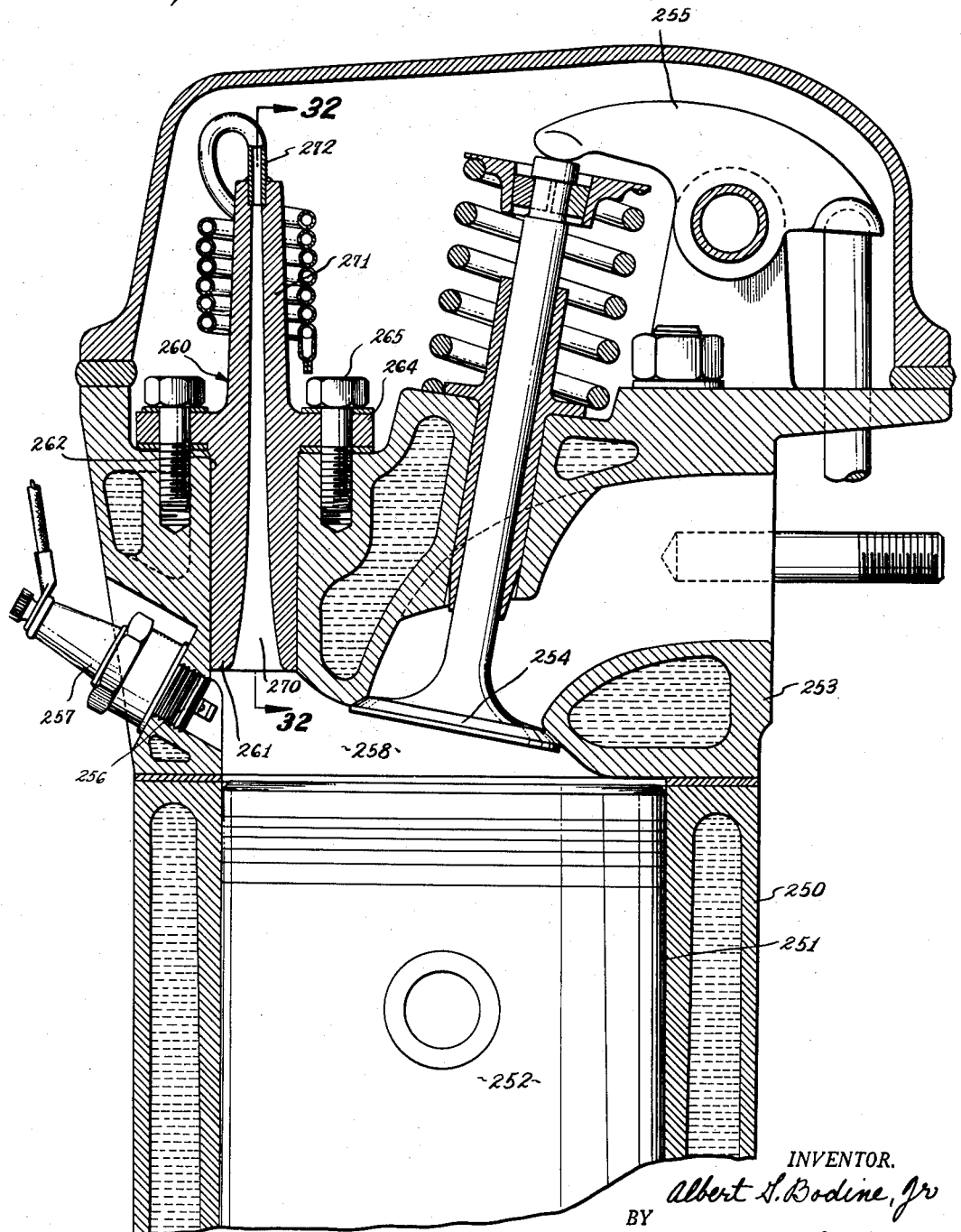

United States Patent Office 2,738,781
Patented Mar. 20, 1956

2,738,781

ENGINE DETONATION CONTROL BY ACOUSTIC METHODS AND APPARATUS

Albert G. Bodine, Jr., Van Nuys, Calif.

Original application July 2, 1951, Serial No. 234,688, now Patent No. 2,573,536, dated October 2, 1951. Divided and this application October 24, 1951, Serial No. 252,818

8 Claims. (Cl. 123—191)

This invention relates generally to internal combustion engines and more particularly to methods of and means for suppressing irregular burning and detonation of fuel-air mixture therein. The invention involves the application of certain acoustic techniques and devices to combustion engines, and consists broadly in the use of such techniques and devices in combination with combustion chambers of engines. The invention is based upon my discovery that combustion detonation can be alleviated by attacking the problem in the light of theoretical and experimental findings evidencing it to be involved with acoustic phenomena; or by simply applying certain methods and apparatus which can be shown to have certain acoustic features or properties.

The present application is a division of my prior co-pending application Engine Detonation Control by Acoustic Methods and Apparatus, filed July 2, 1951, now Patent No. 2,573,536.

In the operation of internal combustion engines of the piston and cylinder type, it commonly happens, as a result of improper spark advance, inferior fuels, bad design, improper operation, too high a compression ratio for available fuel, or other reasons, that irregularities of combustion occur during the combustion cycle so that operation of the engine is noisy and its various parts are subjected to sudden violent shocks, and, in some cases, to mechanical or thermal stresses above those for which they were designed. The term "detonation" has been applied to a variety of such irregularities in the operation of internal combustion engines, all of which may not result from exactly the same causes or manifest themselves in exactly the same way. Operation under detonation conditions not only results in unsatisfactory engine performance but also in damage to the engine such as enlargement of the bearings, buckling of crank pins, burning and cracking of pistons and rings, buckling of rods, or cracking of the block or cylinder head. Since serious detonation results if the engine is designed with too high a compression ratio for the fuel, one way of avoiding detonation is to design the engine with a compression ratio substantially below the danger point. However, it is desirable to use the highest compression ratio possible in order to achieve maximum fuel economy and performance, and most engines, therefore, especially aircraft engines, are designed to operate at a compression ratio which is so high that they are always on the verge of detonating. To the present time, detonation is controlled by keeping the compression ratio below the danger point, or by use of leaded and expensive ring hydrocarbon fuels. None of these expedients, however, is a fully satisfactory solution, as is common knowledge.

It is accordingly the primary object of the present invention to provide improved methods and means, based on the science of acoustics, for suppressing or controlling detonation in internal combustion engines.

While the causes and manner of occurrence of detonation are still subject to research which may reveal new and unexpected aspects, most investigators agree that detonation occurs when normal combustion, at its relatively slowly traveling flame front, somehow causes the pressure and temperature of the last part of the charge to reach its kindling point causing the remaining portion to go off spontaneously and at a very rapid rate; that is, it "detonates." The violent rise in temperature and pressure resulting from this detonation of the last portion of the charge is very often a shock phenomenon which sets up violent compression waves throughout the combustion chamber. I have found that these waves are actually high energy sound waves, consisting of alternate waves or pressure cycles of condensation and rarefaction following one another by 180° in the time cycle, or at least that they include such sound waves to an important extent; and that these sound waves regularly include resonant frequencies causing them to form standing wave patterns in the combustion chamber which may be calculated according to principles governing cavity resonance sound waves. The frequencies of these sound wave patterns are of course modified by the pressure and temperature of the gases involved and the resonant frequencies of adjacent mechanical structures such as the cylinders, pistons, connecting rods, etc., in pressure communication with the combustion chamber gases.

It has been observed that while ordinary normal combustion proceeds with a more or less gradual increase in pressure to a pressure peak, and a gradual decline therefrom, during which any sound waves present are of low order or harmless magnitude, when detonation occurs, pressure builds up with great rapidity to a pressure peak of amplitude substantially in excess of that normally encountered and a number of these excess pressure peaks may occur in rapid succession during the power stroke. Pressure cycle patterns which I have obtained with sensitive instrumentation reveal that detonation is often initiated by a preliminary shock wave in the nature of one or two suddenly occurring high pressure peaks, and that this first sudden pressure peaking is followed, usually after a momentary decline, by a secondary and more prolonged phase consisting of succeeding pressure peaks of first increasing and then diminishing magnitude. Careful investigation shows that sound waves of low amplitude and energy content are present in the combustion chamber in the predetonation phase, and that the frequency of the wave pattern tends to increase during the high wave amplitude detonation phases, due very likely to increased gas temperatures caused by the detonation.

My investigations have shown that these phenomena, including the pressure peak or shock phase which often introduces the detonation, are of an acoustic nature developing from one or more points of sound wave origin within the flame in the combustion chamber. The sound waves so generated in the combustion gas travel to and are reflected or "echoed" by the relatively rigid chamber walls, the successive reflections of waves of resonant frequency probably interfering to re-enforce one another and so promote high amplitude resonant standing wave patterns in the gas. I believe that standing waves with attendant pressure and velocity anti-nodal regions are present in at least some of the cases, if not always, but their existence is apparently unnecessary to the applicability of the invention in view of its ability to handle acoustic shock phenomena alone. The extreme stresses set up in certain members of the engine as a result of detonation evidences the occurrence of one or more pressure anti-nodes, but the impact of the violent traveling waves of compression and rarefaction on the reflective surfaces of the engine is enough to account for the usual detonation manifestations. A substantial degree of reflection of the traveling acoustic waves by the walls of the combustion chamber is, I have found, to be expected with the acoustic wave pattern which is inherent in detonation.

The term "wave" is used generally herein to classify the operation with the usual performance of an extended gaseous body wherein the dimensions of the body are appreciable relative to an identifying wavelength, which wavelength is calculated from the speed of sound therein divided by the noted pressure cycle frequency. In other words, the term "wave" is used to denote rapid pressure cycle action in an elastic medium, namely, the combustion chamber gas. This definition applies throughout the specification and the claims.

I have discovered certain intimate connections and coactions between sound waves and combustion, and these are germane to the invention. In my research on this subject, I have found, for example, that sound waves in a combustion chamber will literally turn a flame off and on, apparently owing to fluctuations in fuel and air density with the compression and rarefaction phases of the sound wave. Again, I have found that this periodic sound-wave-controlled combustion, because it is a periodic source of pressure pulses, can actually generate or regenerate sound waves. By regeneration, I refer to an action involved wherein an incident sound wave has an effect on combustion activity, and the resulting periodic combustion pressure deviation acts as a thermally driven pressure pulse source to re-enforce the original sound wave, causing a "regenerative" build-up of both the sound wave and the combustion fluctuation. The combustion chamber of an engine has a tendency to resonate, and when it resonates, there is apparently a secondary extraction of energy from the combustion process which is converted into sonic energy. It is as if a parasite sonic engine process were driven by the engine's combustion chamber. The resulting echoing sound wave, reflected back and forth through the combustion chamber, seems to turn the flame off and on, or at least to fluctuate it, apparently as a result of the periodic fluctuation of gas density owing to the sound waves as explained above. This fluctuating combustion is, of course, a periodic pressure pulse source which is ideal for generating sound waves; and of course this sound wave generation, or regeneration, occurs at the frequency of the waves incident on the flame, the wave frequency being a function of echo-time or cavity resonance. The periodic combustion is then a function of chamber resonance which is a function of chamber dimensions and boundary conditions. I have found that this regenerative process, which thus involves a marriage of acoustics and thermodynamics, is the cause of one of the most troublesome forms of detonation. Apparently an otherwise orderly combustion cycle might divide up into a rapid series of "explosions" having acoustic features.

The term "detonation" is sometimes used in a loose sense to cover combustion irregularities of all kinds, even engine knocking due to "preignition." It should be understood that my use of the term "detonation" is confined to the described high pressure cycle phenomena of acoustic causation. With this understanding, detonation in piston forms of combustion engines is found, as already mentioned, in an acoustic pressure cycle pattern having two distinguishable phases, first, a high pressure peak or shock phase, and second, a more continuous or prolonged high amplitude sound wave pattern, of rising and then decaying amplitude. Sometimes the shock phase occurs after a few cycles of high amplitude sound wave pattern, and is then followed by another high amplitude sound wave pattern. The two phases or types, i. e., shock and sustained high amplitude wave pattern, are usually found together in the acoustic pressure cycle pattern, though it appears possible that either may occur without the other. Both, however, are of acoustic nature.

The high pressure peak or shock wave, which often introduces detonation, is of steep wave front, and when analyzed, reveals the presence of high frequency sound wave components, which are seriously harmful in their action on the chamber walls.

The sustained or continuous wave pattern phase, commonly of rising and then decaying amplitude, occurs, I have found, at one or more resonant frequencies of the combustion chamber. This wave pattern usually, and possibly in all cases, involves a regenerative interaction between the cyclic combustion pressures and concomitant sound waves. The action is apparently somewhat analogous to a phenomenon known in acoustics as the "singing flame." The first detonation pressure shock compresses the fuel charge sufficiently that the rate of combustion suddenly increases in a localized region of the chamber; this increases the amplitude of the pressure peak thereat, which in turn launches a pressure pulse which is transmitted with the speed of sound to the combustion chamber walls, whence it is reflected back to increase the combustion rate on the subsequent wave cycle, and so on. The increment of added pressure rise on each half-cycle of the pressure wave is limited by the time interval involved during that half-cycle, of the pressure wave is limited by the time interval involved during that half-cycle, but succeeding pressure wave peaks occuring thousands of times per second are of higher and higher amplitude until a maximum is reached, the limit possibly being imposed by exhaustion of the fuel charge locally by this series of "explosions". In other words, each cycle of the sound wave causes the flame to give out a pressure pulse, and each pressure pulse adds acoustic energy to the wave pattern, which cooperative and regenerative performance continues to a maximum. The wave pattern then gradually decreases or decays from this maximum. It must be understood that in the case of piston engines, this high frequency regeneration performance takes place during only a part of the piston stroke. This performance, even if only continued for a few cycles, is very destructive to engines.

Taking into account the acoustic nature or aspect of detonation in combustion, the present invention, in method, contemplates acoustic attenuation of offensive high amplitude sound waves or gas pressure vibrations (including both types discussed above), accompanying detonation in combustion. In apparatus, it comprises an acoustic attenuator, responsive to the high amplitude sound waves or sound wave frequencies of detonation, i. e., to the frequency of frequencies of the acoustic pressure cycle pattern caused by detonation, operatively combined with a combustion chamber, in acoustic communication therewith, and capable of suppressing said waves (or acoustic pressure cycle pattern) sufficiently to render the same harmless. By acoustic communication, I refer broadly to any arrangement by which the detonation sound waves generated in the combustion chamber can be transmitted effectively between the source of detonation and the attenuator. The communication may be via an open gas path or passage, a vibrating solid medium, through pores, crevices or capillary-like passages, through a body of packed fibers, or the attenuator may actually be within, or form a part of the walls of the combustion chamber, or it may be enclosed inside the chamber. In many cases, the important transmission is from the chamber to the attenuator, such as instances of a non-reflective wave guide and attenuation means which simply absorbs and dissipates the wave without reflection back. In other cases, the more important consideration is the extent to which the attenuator is delivering sound wave energy into the combustion chamber in such phase as to have a cancellation or decoupling effect on the thermal drive of the sound wave pattern in the chamber. It may also be noted at this point that the acoustic attenuative provisions used in the practice of the invention are in some cases easily recognized devices or formations, but are often of subtle character, such as acoustically designed attenuative configurations or shapes formed in or on the members defining the combustion chamber, including the top structure of the piston. However, in all cases these are characterized and distinguished from previous combustion chambers and pistons by their acoustic properties.

In the practice of this invention, acoustic attenuation involves the acoustic suppression or reduction of the amplitude, intensity, or energy content of these rapid pressure variations, the attenuating action being applied in such forms and places as reduction of generation, or of regeneration, at the source, or reduction of gas vibration patterns at some point removed from the source. Actually, in the case of standing waves, there is usually no basic difference where in the wave field the attenuation is applied, because a proper acoustic limitation of a standing wave in one region can affect the wave elsewhere; for example, under some circumstances, "spoiling" of a wave at a pressure anti-node by installing a low impedance device thereat can reduce the ability of the source to drive the wave.

It is not my purpose to suppress all sound waves in the combustion chamber, particularly since it is apparent to me that a certain degree of controlled sound wave activity, or certain sound wave frequencies, are not harmful, and indeed are actually helpful, perhaps even essential, to an efficient and rapid combustion process. It is my purpose, however, to control or attenuate the violent, high amplitude sound waves, or sound wave frequencies, which are characteristic of detonation. It is a keystone concept of my invention that high amplitude sound waves are not merely an effect or result of detonation, but are part of the detonation process. With this in mind, it is not solely my purpose merely to "cushion" the engine from pressure wave damage, but rather to attack detonation at its source by selectively suppressing the responsible sound wave pressure cycles. The invention serves either to prevent the effective generation of harmful detonation sound waves in the first instance, or at least to suppress them instantly after initiation, preventing their reflection and re-reflection within the combustion chamber, and also preventing them from reacting regeneratively on the combustion process. In any event the acoustic basis for detonation is destroyed.

My acoustic attenuators can be of either or both of two types, viz., energy dissipative, and spoiler. The first operates by conversion of the acoustic energy of detonation into heat. The second operates by setting up acoustic conditions incompatible with generation or maintenance of the offending wave, the latter type being especially applicable to higher modes, which are explained hereinafter. Also, as will later appear, the attenuator often operates partly by "dissipation" action and partly by "spoiler" action, it being difficult in some cases to say with assurance which is dominant.

The invention may also be broadly regarded as including the concept of inhibiting or suppressing the resonant characteristics of the combustion chamber, considered as an acoustic chamber or cavity, thus removing or substantially reducing a factor in the maintenance of high amplitude acoustic detonation waves. The invention accordingly contemplates the suppression of acoustic wave reflection and resonance within the combustion chamber as a method and means for preventing or stifling the high amplitude pressure wave phenomena of detonation.

Broadly speaking, the present invention provides, in one of its aspects, a combustion chamber which is essentially an "anechoic" acoustic chamber insofar as detonation frequency waves are concerned. By an anechoic combustion chamber I do not refer to 100% elimination of echoes or reflections, but the very material and substantial reduction thereof, to such an extent that detonation conditions springing from resonance or sound wave reflections inside the chamber are very materially suppressed. Normal combustion may involve certain low amplitude wave patterns, and it is not my purpose to eliminate these, since they are not harmful, and seem likely even to be beneficial to combustion. The "anechoic" combustion chamber of the present invention is thus not designed to be an absolute "dead chamber," but only to have such sound wave attenuative characteristics as to assure suppression of the high amplitude detonation wave pattern to a harmless level. It is to be understood that the term "anechoic" is used with this meaning throughout the specification and claims.

Those versed in the acoustic art are aware of various ways in which certain rooms can be treated to make them essentially anechoic. I have shown herein several illustrative embodiments of the invention, in which acoustic attenuator devices are operatively combined with the combustion chamber of an internal combustion engine, and several principal forms will now be explained. In all of these, the acoustic attenuator means is designed or selected to be "responsive" to, that is, to operate at or throughout, the detonation frequencies to be combatted, it being understood that acoustic attenuators in general are not equally responsive to all sound wave frequencies, but, to a greater or lesser degree, depending upon their type, are predominantly responsive to certain frequency ranges. In this connection, it is also found that the frequency response of an attenuator is often a function of its temperature, this following from the effect of temperature on the velocity of sound, especially in the attenuators having gas therein. The attenuator used is accordingly to be one responsive to detonation frequencies at its operating temperature.

The "spoiler" type of attenuation will first be considered. The impact of a sound wave in a gaseous body against a relatively rigid reflecting surface is a phenomenon involving high "acoustic impedance," by which is understood the ratio of cyclic gas pressure amplitude to gas particle velocity amplitude. Usually a high impedance region is located at a rigid reflector. The present invention, in the aspect under consideration, contemplates the attenuation of certain sound waves of detonation by interfering with or cancelling, or "spoiling" their reflection at the relatively rigid "high impedance" reflecting surfaces of the combustion chamber. This interference is accomplished by introducing, immediately adjacent a high impedance region of the standing wave, a region of low acoustic impedance for the frequency of the wave. As implied hereinabove, lowering of the high impedance at one place in a standing wave by installation of an artificial low impedance thereat automatically produces similar effects at all other high impedance regions of the wave. Several types of low impedance attenuators are applicable, including resonators such as Helmholtz resonators and quarter-wave cavities or spoilers. The waves of standing wave frequency generated by the detonation thus travel from their points of origin to the reflecting surfaces or high impedance regions of the wave, but there meet two incompatible high and low impedance conditions, which substantially spoil the reflection, thus preventing the regenerative build-up of this standing wave system by the source. In effect, the low impedance region "short circuits" the high impedance region; and, of course, the combustion wave-source cannot build up the wave in the presence of such a critical short in the acoustic circuit. The detonation waves are thus substantially attenuated back at their point of origin within the flame by attenuation action imposed at the surfaces of the chamber. Accordingly, the phenomena of wave reflection with regeneration and large amplitude wave patterns are substantially eliminated for the chosen wave frequency, and no large stresses therefrom are exerted on the engine.

Explained differently, the present invention, in the form under consideration, may be conceived of as consisting first in identifying an impedance which must exist in a particular region (because of impedance values elsewhere in the combustion chamber) in order for a thermally driven sound wave to exist, and then installing a substantially different impedance at this region, so as to "spoil" the wave. This critically limits or attenuates the wave action everywhere. The action here described is useful with the regenerative type of thermal source which depends upon a coacting wave, and particularly also with a source whose operation depends upon its being located at a high impedance region of a wave pattern.

The same Helmholtz or quarter-wave resonators are also "dissipative" of acoustic energy, especially for high amplitude acoustic waves such as are involved in the problem at hand. The dissipation comes about through flow losses owing to such effects as gas turbulence, heat conduction to the walls of the resonator, and thence to the cooling system of the engine, and rectification of pulsating acoustic energy, into direct current flow energy. So long as the resonators are designed in accordance with the acoustic principles, as taught herein, it is not too important whether they attenuate primarily by spoiler action or primarily by dissipation.

In a typical and illustrative practice of the invention, the walls defining the high impedance reflective surfaces of the combustion chamber are provided with or breached by a plurality of acoustic wave attenuation cavities in the nature of resonators, which communicate through said surfaces with the combustion chamber. In other words, they are in acoustic communication with the combustion chamber. These cavities (which may be used in the walls of the cylinder head, or in the end of the piston, or all of them) are precisely designed or "tuned" to be resonant to the predominating detonation frequency, which is very often of the order of 5,000 to 10,000 C. P. S. They may typically consist of Helmholtz resonators, or quarter-wave pipe resonator cavities or spoilers.

Assuming quarter-wave pipe resonator cavities in the form of cylindrical drilled holes, a detonation frequency of 9,000 C. P. S. to be suppressed, and sound wave velocity of 3,000 ft. per second in the heated gases, it is apparent from elementary sound wave theory that the depth of the cavities will be substantially one inch. (Frequency times wavelength equals wave velocity.) The operation of this specific type of cavity may be explained in terms of the sound wave reflection that is characteristic of quarter-wave pipes. Thus a wave of condensation (positive pressure wave) approaching the high impedance reflecting surface surrounding or adjacent the cavity will tend to be reflected by the surface, and a portion will also tend to enter and traverse the wave guide formed by the cavity. Reflection will occur at the inner end of the cavity, and, assuming proper cavity depth, the wave will return to the mouth of the cavity as a reflected wave of condensation just 180° following the instant of its initial entry. But at this time the wave of rarefaction (negative pressure wave) that follows the original wave of condensation by a time lag of 180° has occurred in the main chamber in the region of the reflecting surface and the mouth of the cavity, and this wave of rarefaction and the reflected wave of condensation emitted from the cavity neutralize and cancel one another. Thus the original wave train is split into two mutually interfering components of substantially 180° phase difference which act to destroy one another, and so eliminate the effect of the wave train, including its effect upon the flame. It should be appreciated that just any depression or cavity will not suffice; an actual practice of acoustics, assuring the necessary phase relationships and/or relative acoustic impedances is necessary.

The analysis in the case of Helmholtz resonators must be somewhat altered in view of the absence of the simple phenomena of reflection time from a closed inner end of such a resonator. The Helmholtz resonator will nevertheless act to return a received pressure pulse in like kind (positive or negative) 180° in time cycle after its reception, and it hence behaves in the invention as the equivalent of a quarter-wave cavity. The use of both quarter-wave cavities and Helmholtz resonators may however be explained in terms of acoustic impedance, both operating at the accurately determined frequency to present a low acoustic impedance to the unwanted sound wave mode at a region adjacent to a high impedance reflecting region for the wave, and thus serving to "short circuit" the high impedance reflecting region with the result of "spoiling" the wave.

The invention has now been described in a form employing Helmholtz and quarter-wave resonators, both of which are effective in either or both of two ways, viz., as "spoilers," and as dissipators.

As already explained, a Helmholtz resonator is not only able to limit a sound wave by providing a region of low acoustic impedance adjacent to a region of high impedance, thus reducing wave reflection, but also by dissipating acoustic energy. If the cross-sectional area of the neck of the resonator is ample, large amplitude waves at its resonant frequency will be attenuated or absorbed primarily by flow losses in the region of the neck of the resonator caused by a mass plug of gas oscillating back and forth therein with large velocity against the spring resistance offered by the gas volume in the cavity of the resonator. The Helmholtz resonator suggested above may also be used in a further and different manner. With a neck of greatly reduced cross-sectional area, e. g., near capillary-like dimensions, the waves may be absorbed by viscosity. Attenuation by flow effects and viscosity both come under the general heading of acoustic dissipation. In a modified form of the invention, I employ one or more Helmholtz resonators formed or installed in or near the walls of an internal combustion engine, together with a means in the neck of each such resonator for giving the passageway a high resistance or dissipation factor owing to viscosity. This result is accomplished by placing in the neck of the resonator a porous barrier in the form of a screen or porous or fibrous plug, wall or body, presenting to the incident waves an array of tortuous passages of small transverse dimensions, some of which may terminate within the body of the barrier, and some of which may extend entirely therethrough. It must be understood that a porous barrier or body will cut down the cross-sectional area of the neck and thus lower the frequency of the resonator so that it may have to be tuned as an assembly. The devious passages with which this body is honeycombed offer very great resistance to a broad frequency band of waves owing to the effect of viscosity which comes into play in the high velocity, low impedance neck of the resonator when the passages are sufficiently small in transverse dimension.

Used within the neck of the resonator, the main benefit of such a porous body is to materially reduce the "Q" of the resonator, flattening the peak of the resonance curve, and therefore increasing the frequency band width which will be subject to attenuation by the resonator. The resonator will still have the necessary characteristic frequency response with a resonance peak for waves of a certain frequency, but the peak will not be so sharp. In practice, the resonator is designed to have its resonance peak near the principal detonation frequency, and by virtue of the broadening of the wave band resulting from use of the porous body, not only that frequency, but other frequencies for a considerable range on either side thereof are materially attenuated. In this connection, it should be understood that the true objective is that the attenuator be "responsive" to, i. e., have a material attenuative effect on, the offensive detonation frequency, and that I employ the expression "frequency response" to denote an attenuative response or action for a frequency which is to be suppressed. In some cases the device may desirably have a relatively high "Q," but in others, e. g., where a single attenuator is to suppress two or more separated detonation frequencies, or a relatively wide band resonant peak, broadness of tuning is desirable. Thus a broad tuning device, such as the form of attenuator here described, may have concurrent frequency response to two or more separated detonation frequencies, and will cover a resonant peak spanning a wide frequency band. The nearly capillary-like passages extending into and through the plug or body in the neck of the resonator of course have an attenuative effect of their own by introduction of an additional frictional loss. This however is not necessarily too important, since the attenuative effect of the Helmholtz resonator is usually sufficient without such aid. The broadening of the response band is however a useful feature, especially with engines having shifting or varying frequency of detonation.

The invention may also be practiced by using the porous bodies in the form of walls or pads in or on the walls of internal combustion engines for their ability to absorb sound waves even without the use of the resonator cavities behind them. Even in this case, the frequency response characteristic has to be considered, and can very often be determined by standard acoustical tests for the frequency-absorption curve of the porous material, with temperature correction for operating conditions. The capillary-like pores or passageways extending into and through these porous walls offer very great viscous friction to the incident waves, and if the walls are made of sufficient thickness relative to the wavelength, virtually 100% of the incident wave energy could be thus absorbed. In a practical engine installation, where the thickness of the porous wall is somewhat restricted, something less than 100% absorption will be gained, but the gain will nevertheless be substantial and important. When used alone (without a resonator), I prefer to have one dimension of the porous body at least as great as one-eighth wavelength in order to assure a wave transmission path of appreciable length through the porous material. Considerable improvement in several different respects results from adding the resonator cavities in back of the porous walls. First, these resonator cavities may be designed to be resonant at the most offending detonation frequencies, so that maximum attenuation corresponds to the most damaging wave frequencies. Second, the resonator cavities are effective as an aid at the lower wave frequencies where the effectiveness of losses by porous absorber alone is diminished. Further, by using resonator cavities in back of the porous wall, the wall thicknesses of the latter may be considerably less for a given degree of attenuation than would be required with the porous plugs or walls used alone. Finally, the resonator tends to increase the oscillatory motion of the gas particles in the porous material, thus further increasing the effectiveness of the attenuator.

In another principal embodiment of the invention, I provide an anechoic combustion chamber by giving a configuration to the combustion chamber walls which results in attenuation of the detonation frequency sound waves within the chamber. In an illustrative embodiment, the top wall of the chamber, above the piston, is in the form of an exponential horn, forming a non-reflective wave guide, and provided preferably with a narrow passageway at its throat forming an attenuative termination. The term "exponential," in the specification and claims hereof, is inclusive of the family of substantially non-reflective horns similar to exponential, including such as hyperbolic and catenoidal. Such a formation, of proper frequency response as explained hereinafter, effectively absorbs or attenuates detonation sound waves generated within the combustion chamber, and provides an essentially anechoic combustion chamber for detonation wavelengths. Attenuation is further improved by packing the small end of such a horn with sound wave absorption material, such as fiber glass or the like. It is also within the scope of the invention in this general form to modify existing or conventional combustion chambers by incorporating therewith or connecting thereto an accessory chamber extension having a configuration of exponential shape, ending at its throat in an acoustic attenuator. I have devised a number of ways in which acoustic horn shapes can be combined with engine combustion chambers, and a number of these will be disclosed hereinafter.

I have found that the porous absorber types, and these horn types, are usually more effective than are the sharp tuning spoilers for attenuating the acoustic shock type of acoustic detonation.

The invention will be more fully understood from the following detailed description of present illustrative embodiments thereof, reference for this purpose being had to the accompanying drawings, in which:

Figure 9 is a vertical sectional view through an engine incorporating acoustic attenuator means of a pipe resonator type;

Figure 10 is a fragmentary detail showing a cross section of a modified combustion chamber wall incorporating Helmholtz type resonant absorbers;

Figure 11 is a view similar to Figure 10, but showing a modified type of pipe resonator absorber;

Figure 12 is a fragmentary plan view of a piston incorporating a half-wave type of pipe resonator;

Figure 13 is a section on line 13—13 of Figure 12;

Figure 14 is a plan view of a piston incorporating another type of pipe resonator absorber;

Figure 15 is a section taken on line 15—15 of Figure 14;

Figure 16 is a plan view of a piston embodying the attenuators in the nature of Helmholtz absorbers;

Figure 17 is a section taken on the line 17—17 of Figure 16;

Figure 18 is a fragmentary sectional view of a piston incorporating another design of Helmholtz resonator;

Figure 19 is a fragmentary sectional view of a piston incorporating another type of Helmholtz resonator, and showing also the use of a rattling element for carbon scouring purposes;

Figure 20 is a fragmentary sectional view of a combustion chamber wall showing the use of a vibrating membrane absorber covering the neck of a cavity.

Figure 21 is a vertical transverse section through the block and head of a modified form of engine incorporating a modified form of the invention;

Figure 22 is a longitudinal sectional view through a modified attachment auxiliary embodying one form of the invention and capable of typical use in connection with the engine of Figure 21;

Figure 23 is a view similar to Figure 22 but showing another modification.

Figure 24 is a view similar to Figure 22 but showing another modification;

Figure 25 is a view similar to Figure 22 but showing a modification serving also the purpose of a spark plug adapter;

Figure 26 is a vertical transverse section through the block and head of a modified form of engine incorporating a further modified form of the invention;

Figure 27 is a detail of a modified combustion chamber extension capable of substitution for that shown in Figure 26;

Figures 28 to 30 are longitudinal sectional views through auxiliary devices embodying different conversions of one form of the invention, and capable of typical use with the engine of Figure 21;

Figure 31 is a vertical transverse section through the block and head of a modified engine incorporating another form of the invention;

Figure 32 is a developed view of the horn of Figure 31, taken in accordance with a curved plane passing through the line 32—32 of Figure 31;

Figure 33 is a bottom plan view of the horn member of Figures 31 and 32, showing the curvature of said member as seen in a horizontal plane;

Figure 34 is a plan view of a piston incorporating a horn type of wave guide and attenuator;

Figure 35 is a section taken along the line 35—35 of Figure 34;

Figure 36 is a plan view of a piston incorporating another form of horn type wave guide and attenuator;

Figure 37 is a section taken on line 37—37 of Figure 36;

Figure 38 is a view similar to Figure 36, but showing a modification;

Figure 39 is a fragmentary sectional view through a piston showing a modified form of horn type wave guide and attenuator;

Figure 40 is a partly elevational, partly sectional view of a piston configured to provide a horn type wave guide and attenuator between its periphery and the wall surfaces of the cylinder.

Figure 8A:
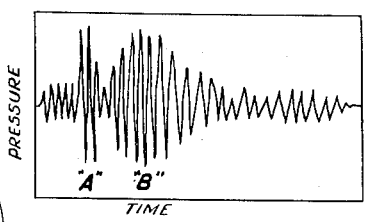
Figure 8a is a graph of combustion chamber pressure vs. time, showing the characteristic pressure cycle pattern, which I have determined to be of acoustic nature.

Reference is directed first to Figure 8a, showing a typical or illustrative pressure cycle pattern occurring in a detonating engine combustion chamber as viewed on a fast sweep oscilloscope driven by a sufficiently sensitive pickup connected to the chamber. The pattern shows the two previously described phases of detonation, the initial shock phase, indicated at "A," and the prolonged secondary phase, of rising and then falling amplitude, at "B." The pressure cycle pattern varies with different engines, different fuels, and different conditions of engine operation. Sometimes the initial shock phase does not appear, sometimes it may suddenly occur after a few cycles of rising pressure amplitude, and sometimes the detonation may be almost entirely of shock wave character. Again the shock wave may intervene in the course of a prolonged high amplitude pressure wave performance. Figure 8a is accordingly merely illustrative of one typical pressure cycle pattern under detonation conditions, showing in this instance the two characteristic types of pressure wave manifestation found in detonation. My investigations have shown that this detonation pressure cycle pattern, in both its described phases, is of acoustic nature, and that at least the prolonged secondary phase, as described above, occurs at resonant frequencies (fundamental and higher modes) of the combustion chamber.

The modern trend in engine design is toward valve-in-head engines of simple, symmetrical combustion chamber shapes, typically geometric figures of revolution. In line with this trend, I have chosen, for some of my test work, a valve-in-head engine having a flat pan-cake cylindrical combustion chamber such as is used in the well known Cooperative Committee Test Engine known as the C. F. R. engine. With this engine I have made a thorough acoustic analysis of the combustion chamber when the engine is not running; and using this analysis, I have been able to make the combustion chamber substantially anechoic for detonation wave patterns. Thereafter the engine has operated substantially free of detonation at compression ratios ranging between 8 to 1 and 12 to 1, using low grade fuel. Discussion of this treatment of a typical engine will greatly aid the understanding of the invention.

This test engine had a 3 inch bore, and the piston was usually between ½ and ⅝ inch distance from the head when detonation occurred. I drilled an opening through the cylinder head and installed therein an acoustic driver consisting of an oscillator driven transducer having a relatively flat output characteristic for the range of frequencies of interest. This transducer, consisting of a stack of magneto-strictive laminations, was driven by an adjustable frequency electronic oscillator so that the transducer could be made to generate sound waves of any desired frequency in the combustion chamber. For exploring the acoustical patterns within the combustion chamber, I placed a piston in the bore and adjusted its distance from the cylinder head to a distance of approximately 9/16 inch. I drilled a small opening through the piston head, centered 1⅛ inches from the center of the piston, and mounted in this opening a high fidelity condenser microphone having a flat response curve. Then, by rotation of the piston in the cylinder, the acoustic standing wave at different locations around the combustion chamber could be explored.

Figure 5:
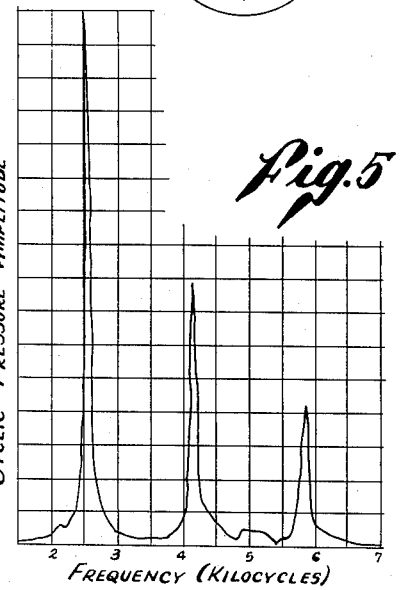
Figure 5 is a graph of cyclic pressure amplitude vs. frequency, showing resonant peaks found in the same combustion chamber.

The piston was rotated to a position wherein the microphone carried thereby picked up a strong signal. Then, by varying the frequency of the driver from a few hundred cycles per second to about six thousand cycles per second, I obtained the pressure amplitude response curve shown in Figure 5. When the driver frequency passed through a resonant frequency of the combustion chamber, the amplitude, as registered by the pickup microphone, was very high. It will be noted from Figure 5 that the cavity formed by the combustion chamber had a very high Q; that is, it tuned sharply, giving a very high amplitude in a very narrow frequency band. The radial mode (second overtone), occurring at approximately 5,000 cycles, was very weak compared with the fundamental, because neither the microphone nor the transducer were at the center of the cylinder where the radial mode has its optimum high impedance region. However, as shown by the graph of Figure 5, it was nevertheless possible to determine the frequency of this radial mode.

To explore the standing waves in the combustion chamber, the piston, with the microphone mounted therein as heretofore described, was rotated so that the microphone area swept the standing wave pattern. To simplify the analysis for each resonant frequency, the driver was adjusted for the purpose of each such exploration to the single fixed frequency for each of the resonant peaks shown in Figure 5. By this procedure, it was determined that certain characteristic standing wave patterns such as shown in Figures 1 to 4 were present in the combustion chamber, the four diagrams of Figures 1 to 4 being of the standing sound wave patterns corresponding respectively to the first four resonant peaks up to 6,000 cycles in the graph of Figure 5, including the small one at 5,000 cycles.

The standing wave pattern for each mode (resonant peak) was determined by counting the number of pressure anti-node regions P (high impedance regions) where the microphone gave maximum reading. The corresponding velocity patterns as shown by the full line and dotted line arrows was then postulated from known facts about cavity resonance. In these diagrams, the full line arrows represent the gas particle velocity for one phase of the acoustic standing wave pattern, and the dotted line arrows represent gas particle velocity for the succeeding phase. That is to say, for 180° of duration of each cycle of the standing wave, the gas particle velocity is in the direction of the full line arrows, and for the succeeding 180° the gas particle velocity is in the direction of the dotted line arrows.

Figure 1:
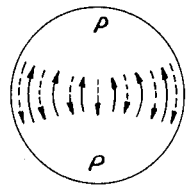
Figures 1 to 4 are diagrams of fundamental and higher mode sound wave patterns found in a flat pancake cylindrical combustion chamber.
Figure 2:
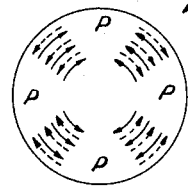
Figure 3:
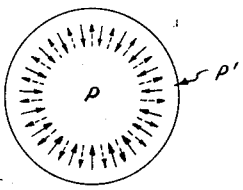
Figure 4:
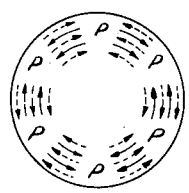

Referring to Figure 1, representing the fundamental frequency mode (cold air frequency of approximately 2,450 C. P. S.), it can be seen that there are two opposite pressure anti-node regions P, and that the gas flow is alternately from one of these to the other, and then in the reverse direction. This is sometimes known as the "sloshing" mode. Figure 2, representing the first higher mode (cold air frequency of approximately 4,000 C. P. S.), shows that there are four high impedance pressure anti-node sectors P, with gas flow regions therebetween having alternate flow patterns as represented by the arrows. Figure 3, showing the second higher mode (cold air frequency of approximately 5,000 C. P. S.), it reveals that this is a radial mode. It was not possible to fully explore this mode with the microphone located as described, and the weak response shown in Figure 5 is owing to the fact that the microphone could not be positioned at the high impedance pressure anti-node regions. However, it was possible to make out the pattern, which involved a high impedance pressure anti-node region P at the center, a single continuous circumferential high impedance or pressure anti-node region P' around the periphery, and radial velocity flow patterns as indicated by the arrows. Figure 4 shows the third higher mode (cold air frequency of approximately 5,700 C. P. S.), whose pattern is essentially similar to the second higher mode, excepting for having six pressure anti-nodes P, with intervening velocity anti-node regions.

The actual angular location of the pressure anti-node and velocity regions depends upon the location of the driver. The driver locates one of the high impedance regions (pressure anti-node), and all the other regions of the pattern then locate themselves according to the laws of acoustics; in the case of a circular combustion chamber, the distribution of the pattern is equiangular, as represented in Figures 1–4. The location of the driver controls the orientation of the pattern, but the equiangular relationship between pressure and velocity anti-nodes is unaffected by driver location. With unsymmetrical combustion chambers, such as in L-head engines, most of the patterns would of course not be symmetrical.

With symmetrical chambers it can be depended upon that whatever the location of the driver, which in an actual engine under running conditions is a source point in a flame of not easily predictable location, acoustic patterns such as shown in Figures 1–4 will be established, though their orientations about the axis of the combustion chamber will not easily be known. Furthermore, in the actual engine, several parts of the flame may function as separate drivers, and a corresponding plurality of similar acoustic patterns may then be superimposed one over another, but with no necessary correlation of orientation between the patterns.

Accordingly, while the acoustic standing wave patterns are ascertainable, including the spacings of the high impedance regions, it is not easy to determine the actual locations of the high impedance regions, where attenuators might be installed to maximum effect. The invention meets the problem of attenuator location in different ways. First, and this is particularly applicable to unsymmetrical chambers, where no symmetrical acoustic pattern of pressure anti-nodes could be anticipated, I employ a substantial number of individual attenuators distributed throughout the combustion chamber, and these may be located in the upper part of the cylinder wall and in the cylinder head, or in the piston, or both. In another embodiment, I employ a single horn-shaped extension of the combustion chamber, typically connected into the cylinder head directly over the piston, together with an attenuator at the throat of this "horn."

Figure 6:
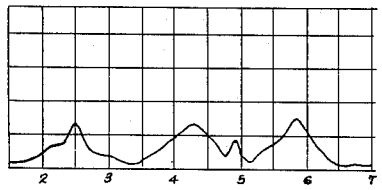
Figure 6 is a graph similar to Figure 5, but showing the effect of use of sound wave attenuators in accordance with the invention.

In one embodiment for symmetrical chambers, I employ just a few attenuators, but so located and spaced from one another as to assure attenuation of the acoustic wave pattern regardless of whether or not the attenuators coincide precisely with the high impedance pressure anti-nodes. Looking at any one of Figures 1 to 4, it can easily be seen that the low impedance velocity anti-node regions (identified by the locations of the arrows) lie midway between the high impedance regions P. Therefore, two attenuators can be installed with a spacing approximately equal to half the spacing between two high impedance regions. Then if one attenuator happens to be too near a low impedance region for substantial effectiveness, the other will automatically be sufficiently near a high impedance region for substantial effectiveness. Such spacing can be called quarter-wave spacing because of the analogy to parallel beam transmission where the distance between high and low impedance nodes is equal to one-quarter wavelength measured along the parallel beam. In this instance an angular division is the simplest. In one later described embodiment, I employ three horn type attenuators mounted in the piston head, positioned near the periphery thereof, and angularly spaced 45° apart. The two outside attenuators are therefore spaced 90° apart, taking care of the acoustic pattern of Figure 1. That is, if one happens to be in the region of the arrows, the other will be near a "P" region. Any two adjacent attenuators are 45° apart, taking care of the mode of Figure 2. Apparently the three attenuators at 45° spacing average out well enough to substantially attenuate the mode of Figure 4, although the ideal spacing for this mode would be 30°. If they are all located near the rim, they then also act on the radial mode shown in Figure 3. Figure 6 is a graph showing the resonant characteristics of the combustion chamber equipped with the three 45° spaced horn-type attenuators as here described. It will be seen that the high resonant peaks of Figure 5, obtaining with the chamber in its natural resonant state, have been lowered to a small fraction of their initial heights. In subsequent actual running tests, the engine with the attenuators installed as just above described, and with acoustic combustion chamber characteristics as represented by the graph of Figure 6, ran apparently knock-free as indicated by listening and by using conventional detonation pickup equipment.

Figure 7:
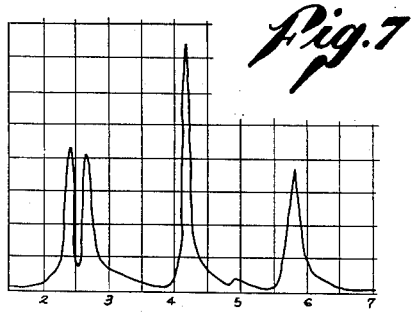
Figure 7 is a graph similar to Figure 5, but showing the effect of an attenuator designed to be responsive to the fundamental frequency resonant peak, but too sharply tuned to remove the whole of said peak.

The graph of Figure 7 shows the effect of using a quarter-wave pipe resonator cavity, in this instance, with a too high "Q." The device tuned so sharply that it took out only the center portion of the resonance peak of the first mode, leaving twin peaks of considerably reduced amplitude, but still too high for complete satisfaction.

Figure 8:
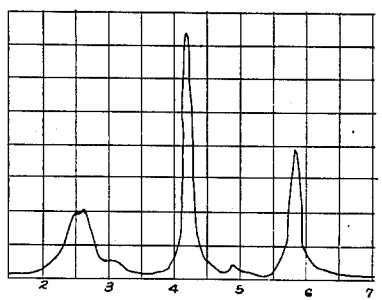
Figure 8 is a graph similar to Figure 7, but showing the effect of use of an attenuator designed for the fundamental frequency resonant peak, with sufficient band spread to effectively reduce said peak to a harmless level.

The graph of Figure 8 shows the result of using a small diameter quarter-wave absorber having lower Q. Very probably the dissipative ability of this low Q absorber can explain a substantial portion of its attenuating action, separate from the "spoiler" hypothesis. This attenuator was effective in reaching out across the entire first mode resonant hump, although it was too sharply tuned to reach other resonant peaks. It may be observed that, with this characteristic, it is possible to employ resonant absorbers responsive to the band width of a given resonant hump but without effect on wave frequencies between humps. This type of attenuator is accordingly often preferred when it is desired to remove the resonant peaks, but to permit free play of waves of small amplitude in the frequency brackets between resonant peaks.

I have found that these above-described modes, such as illustrated in Figure 5, are accurately predicted by the formula:

$$f = k\frac{c}{d}; \lambda = \frac{d}{k}$$

in which:

$f$ is frequency
$c$ is speed of sound
$d$ is diameter of bore

λ is wavelength $k$ is the Bessel function parameter defining each radial or circumferential mode.

I have found further that for the modes of Figures 1–4, the following table, derived from Bessel functions, can be used:

| Figure: | $k$ |
|---|---|
| 1 | 0.59 |
| 2 | 0.97 |
| 3 | 1.22 |
| 4 | 1.34 |

Substituting in the above equation for $f$ will give frequencies agreeing with the above-mentioned experimentally determined frequencies when we assume $c$ (speed of sound) 12,480 inches per second in a cold metal chamber, and $d=3$ inches (3 inch bore). The values of $k$ for each mode are taken from the table. Frequency increases at high temperatures because $c$ (speed of sound) increases. However, this is not too bothersome in most of my designs for attenuators because they usually are designed in accordance with standing wavelength which is not variable with temperature, as indicated by the formula for λ above.

In Figure 9 is shown an L-head engine comprised of a water cooled block 10, a water cooled head 11 fastened to block 10 by means of studs 12 and nuts 13, a piston 14 reciprocable in cylinder 15 in block 10, an exhaust valve 16, and a spark plug 17 approximately aligned with the valve 16. It will be understood that, as in conventional L-head engines, an intake valve (not shown) will be located alongside exhaust valve 16, such valve being of course out of the plane of the drawing. Block 10 and head 11 have cooling jackets 18 and 19, respectively, and head 11 has an inner combustion chamber wall 20, braced by webs 20a, which encloses a combustion chamber space 21 over the cylinder and valve, as shown. The combustion chamber walls, including the upper end of the piston, the upper end portion of the cylinder, and the wall 20, are formed with or breached by a substantial number of acoustic "spoiler" cavities or resonant absorbers, here in the nature of "pipe resonators" consisting of straight cylindrical bores 22 opening inside the combustion chamber. The webs 20a furnish stock in which some of the bores 22 can be formed, and are designed with a spacing distance for proper spacing of the bores 22. It will be seen that regions of the combustion chamber wall surfaces through which these cavities 22 open into the combustion chamber are the "high impedance" reflecting surfaces of the combustion chamber near high impedance regions of a wave pattern; the cavities 22 then provide low impedance regions interspersed with or located within these high impedance regions of the wall surfaces. While these spoiler cavities or resonant absorbers 22 may be of various shapes and cross sections, they are shown in this case as being substantially cylindrical and straight, such as may conventionally be formed by drilling. In some cases I find it desirable to have a chamber or radius on the edge of the hole.

As previously explained, the cavities 22 as shown in Figure 9 are designed to function as quarter-wavelength pipe resonators at the detonation frequency. Assume for example that a given engine has been determined, by test, to be subject to detonation at a frequency of about 9,000 C. P. S. and that it is further determined that the velocity of sound is 3,000 feet per second in the heated combustion gases within the combustion chamber, it is apparent that the wave length of the detonation wave is 4 inches. In such a case, the cavity depth for resonant tuning would be very nearly 1 inch, taking into account the well known end correction for quarter-wave pipes in other usages. Assuming that detonation has been found to occur also at some additional frequency, or frequencies, as is usually the case, some of the cavities are preferably designed to have depths similarly calculated to approximate quarter-wavelengths for any such further frequencies. Still further, in view of the fact that in some engines, i. e., those tending to pump oil, the cavities may tend to gradually accumulate carbon at their inner ends, some of the cavities are in some cases designed to have initially a depth a little greater than one-quarter wavelength for the detonation frequency to which they are designed to respond. Such over-length cavities may not initially be effective to the maximum degree, but as cavities of precisely determined quarter-wavelengths tend to accumulate carbon, and hence to decline in effectiveness, these initially overlength cavities will accumulate carbon until their lengths are exactly quarter-wave, and thus acquire maximum effectiveness. The cavities have, of course, been so designed that carbon deposits can readily be removed at any time that the cylinder head is off.

The depths of the spoiler cavities for resonant tuning being thus determined, it is next necessary to determine their optimum cross section, and also their spacing from one another for optimum results. The cross section of the cavities relative to their depths is one of the factors which govern the "Q," or sharpness of their tuning, i. e., the "narrowness" of the band of sound wave frequencies to which they will respond and therefore which can be absorbed or suppressed. It is desirable that the sharpness of tuning be not too pronounced, lest the band width removed become narrower than the band of offensive detonation frequencies. Particularly for dealing with the fundamental frequency of the chamber, I find it desirable to include a substantial dissipative factor for actual wave absorption, and this lowers the "Q" of the "spoiler." It is also important, on the other hand, that the cross section of the cavities, or their number, be not too great, since it always remains desirable to retain a preponderance of high impedance reflective area relative to low impedance cavity area. Apparently this precaution assures large oscillating flow rate in the dissipative mouths of the cavities. This last-mentioned condition is satisfied when the area of the cavity openings is made to be less than one-half the entire combustion chamber area above the piston at the time of explosion.

With respect to the relation between cavity depth and cross section, I find it desirable that the diameter of cylindrically formed cavities preferably not exceed substantially one-half their depth, and I have found that a diameter of about one-tenth the depth gives good results and affords a substantially dissipative factor. The spacing of the cavities from one another is also a factor of importance. In general, I have found it to be desirable to have this spacing somewhat ample, i. e., approximately a quarter-wave length. By making the spacing substantially a quarter-wave length, lateral waves tending to travel along the combustion chamber wall surfaces are attenuated, since such a wave permitted by one of a pair of quarter-wave spaced cavities will be attenuated by the other. This self-corrected spacing idea was explained with reference to Figures 1–4 above.

In the operation of the engine of Figure 9, sound waves developed within the flame upon the onset of detonation are materially attenuated at the combustion chamber walls, inhibiting thermal-wave coaction in the manner already described in the introductory paragraphs. Briefly, a sustained sound wave of compression or condensation emanating from a detonation origin point within the flame approaches the several combustion chamber walls, and parts of the wave front impinge on the high impedance reflecting walls, while other parts enter the low impedance cavities. The last-mentioned parts of the wave are reflected and returned to the mouths of the cavities as positive pressure waves 180° after their entrance, and therefore coincidentally with the arrival of the wave of rarefaction which follows the original wave of condensation by a time lag of 180°. The waves of condensation returned from the cavities tend to cancel the arriving wave of rarefaction, and the wave generation may thus be very materially suppressed by cancellation. Perfect 100% cancellation is of course not to be expected, but the common detonation manifestations can be virtually eliminated.

As previously mentioned, use of the cavities 22 neutralizes a certain "band" of detonation frequencies, neutralization being most complete for the frequency at the middle of the band, and tapering off in both directions. The width of such a band and the "sharpness of tuning" vary with the ratio of the depth to the cross-sectional area of a cavity. Increase in band width may thus be achieved by increasing that ratio, but it is also possible, and sometimes preferable, to employ the alternative of providing cavities of slightly different depths intermixed over the area of the combustion chamber, each cavity having relatively sharp tuning (high "Q"), and the different depths being selected so as to assure coverage of the full detonation frequency band.

In addition, it can be said that the resonator cavities 22 attenuate the detonation sound waves by dissipation of the acoustic energy, which is converted into heat as a result of flow factor losses, as described earlier. I have also discovered, as already described, that detonation in a combustion chamber may involve more than one detonation frequency band. In such case, of course, use may be made of two or more sets of intermixed cavities having depths properly related to the two or more detonation frequency bands for neutralization or dissipation of said bands. When cavities designed for more than one frequency are being used in the combustion chamber, it is possible to increase the total number of cavities per unit area because an attenuator cavity tuned to a given frequency, and presenting a low acoustic impedance for that frequency, will nevertheless present a relatively high acoustic impedance for other frequencies provided, of course, they are not exact multiple harmonics or overtones. In other words, cavities designed for a given frequency, or frequency band, do not greatly reduce the high impedance reflection area of the chamber for the other usual frequencies. It should also be recognized that quarter-wave cavities of the type of Figure 9 present low acoustic impedance not only for the fundamental frequency, but for odd harmonics of that frequency, and hence are attenuative not only for the fundamental frequency for which they are designed, but for harmonics as well.

Figure 10 is a fragmentary sectional view of a modified combustion chamber wall 20a showing the use of Helmholtz resonator cavities 22a which are characterized by "lumped" constants rather than the "distributed" constants of the quarter-wavelength cavities 22 of Figure 9. As is well known in the acoustic art, Helmholtz cavities such as indicated at 22a are resonant to a given frequency, and provide a low impedance for that frequency. The manner in which they do this, however, is better explained without the analogy of the reflections described in connection with the quarter-wave cavities 22 of Figure 9. Their ultimate effect is the same as that of the quarter-wave cavities 22, since they present a low impedance for their resonant frequency, and since they will return a positive pressure pulse to their mouths 180° of time lag after entrance. Cavities of the type of Figure 10 could hence be substituted for those of Figure 9 without altering the behavior of the system. Both pipe resonator and Helmholtz resonator cavities are known in the art of acoustics as resonant absorbers, in view of their ability to "dissipate" a sound wave of frequency to which they are resonant. Both the pipe resonator cavities of Figure 9 and the Helmholtz resonator cavities of Figure 10 have also this dissipative property, particularly for the high amplitude waves caused by detonation, and may be broadly classed as resonant absorbers.

Figure 11 shows another alternative combustion chamber wall 20b, shown in this instance with heat radiating fins 25. The cavities 22b in this instance are of the quarter-wave pipe resonator type of resonant absorber, such as discussed in connection with Figure 9, but are provided with angular intermediate sections 26, so that the inner end portions of the cavities are laterally offset from the entrance ends thereof. By this arrangement, the interiors of the cavities are somewhat shielded from the heat produced within the combustion chamber. In this connection, it is found in practice that carbon tends to accumulate on surfaces which are in a certain intermediate heat range, and that surfaces maintained at either a relatively high temperature, or at a relatively low temperature, will not accumulate carbon. This is believed to be due to the fact that certain varnishes are produced in the combustion process. These varnishes are capable of adhering to combustion chamber wall surfaces within a certain heat range, so providing conditions favorable to an accumulation of carbon. Both above and below such heat range, the varnishes do not appear on the combustion chamber surfaces and the carbon does not deposit. The embodiment of Figure 11 will be seen to be one means providing offset shielding from radiation for keeping the inner end portions of the resonant cavities at an operating temperature below that for which carbon will deposit. The heat radiating fins 25 shown on the combustion chamber wall 20b are of course also for the purpose of keeping the combustion chamber wall and its passageways 22b at a cool operating temperature.

Referring again to the cavities 22 in the top of the piston of Figure 9, I have found that the piston is an advantageous location for the attenuator, which operates very well even though the piston is moving. I have shown herein a number of piston carried attenuators in addition to the embodiment of Figure 9, some consisting of auxiliary devices secured to the piston structure, and some, such as shown in Figure 9, and also in Figures 34 to 38, inclusive, and Figure 40, embodied or formed in the structure of the piston itself.

Figures 12 and 13 show a modification, wherein acoustic attenuators in the form of half-wave pipe resonators 27 are mounted in the piston top 28 (which of course constitutes one wall of the combustion chamber). As shown, the piston top 28 has cast therein a U-shaped tube 27, whose two open ends open through the top surface of the piston. The length of this U-tube is one-half the wavelength of the detonation sound wave to be combatted. In effect, within its frequency range, the U-tube functions for the purpose herein as two individual quarter-wave pipes and the term "quarter-wave" pipe or cavity in the subtended claims includes these double-pipe, or half-wave forms. Thus a positive pressure wave of tuned frequency generated by a detonation origin point in the flame and incident upon either or both of the two ends of the U-tube will cause it to resonate and thereby function as a resonant absorber. This double, or continuous passage type, is relatively free of carbon accumulation problems.

Figures 14 and 15 show another piston mounted pipe type of device which I prefer to call a wave canceller, designed for combatting first higher mode acoustic patterns as shown in Figure 2. In this instance, there is cast in the head of piston 29 a tube 30 having its two ends opening through the top of the piston at 90° spacing from one another, the openings being here shown as located about three-quarters of the way from the center of the piston to its circumference, and at two of the high impedance pressure anti-node regions P. Such location is made following appropriate probing of the wave pattern. The tube 30 here has a length equal to one full wavelength of the offensive detonation frequency, and is located in a horizontal plane, extending around three-quarters of the piston, as shown. Now, a positive pressure pulse arriving at either end of the pipe will appear at the other end of the pipe as a positive pressure pulse 360° later in the time cycle. It follows that the pressure fluctuations at the two ends of the tube are always in phase. Now, a study of the wave pattern in the cylinder over the piston (Figure 2) shows it is a first higher mode, and the pressure peaks at the 90° spaced pressure anti-node zones marked "P" in Figure 14 hence occur with 180° phase difference. This means that a positive pressure pulse transmitted through the tube from one end thereof to the other will arrive at the far end of the tube coincidently with the occurrence of a negative pressure pulse of the first higher mode wave pattern at the region of said far end of the tube, and the result is a cancellation or attenuation of this mode. This first higher mode is chosen as a convenient example; however, the procedure explained therefor can be applied to other modes, it being only necessary to pipe out-of-phase sound to a high impedance point. For taking care of other possible orientations of the pattern, another pipe shifted in location 45° will do, as explained above.

Figures 16 and 17 show a modified piston 31 whose top is formed with cylindrical sockets 32 to receive Helmholtz resonators 33. These resonators each have a cylindrical body 34, rounded at the bottom, and formed at the upper end with an external annular flange 34a which snugly fits the socket 32, the body 34 otherwise remaining spaced from the piston structure excepting at its lower end. Heat conduction to the piston structure is thus reduced, and the resonator operates at a high temperature. At the bottom, body 34 is provided with a stem 34b extending down through the head of the piston, its lower end being riveted, as at 34c, to secure the resonator tightly in position. The resonator is provided with a top wall 34d, furnished with a downwardly extending tubular stem 34e which opens into the lower portion of body 34, this stem 34e being the neck of the resonator. The farthest inner end portion of the cavity of this resonator, where any carbon might tend to accumulate, will be seen to be the top which is turned toward the heat to give a condition of temperature substantially above the aforementioned range where carbon will deposit, with the result that carbon accumulation within the resonator is minimized or prevented.

Reference to Figure 16 will show that a plurality of resonators has been mounted in the top of the piston in a pattern designed to attenuate the fundamental and also the various higer modes indicated in Figures 1 to 4. Thus, two of the resonators 33 have been mounted at 90° spacing from one another, and these are effective on the fundamental. Such a pair of resonators can be installed, knowing that the type of wave pattern of Figure 1 exists, but without knowing the precise location of the pressure anti-node regions. If one attenuator happens to be too near a low impedance region for substantial effectiveness, the other will automatically be sufficiently near a high impedance region for substantial effectiveness. Then, to combat the first higher mode, two smaller attenuators 33a, which may be like the resonators 33, except to be more attenuative of the first higher mode frequency, are mounted in the piston top at 45° spacing. For the purpose of the third higher mode, two still smaller resonators 33b are mounted in the piston top at 30° spacing. A single resonator 33c is mounted in the exact center of the piston to combat the second higher mode, which is known to be a radial mode and to have a pressure anti-node over the center of the piston. The resonators 33 to 33c are of course designed in each instance to have proper dimensions to be resonant for the respective fundamental and higher mode frequency which they are to attenuate. The distribution of attenuators as shown in Figure 16 assures location of at least one attenuator sufficiently near to a high impedance region of each of the illustrative wave patterns shown in Figures 1 to 4.

Figure 18 shows another modification of piston mounted Helmholtz resonator, the Helmholtz resonator being formed in this instance by a bore 35 extending upwardly through the top 35a of the piston nearly to the top surface thereof, and by a smaller bore 35b extending through the top surface of the piston, the latter forming the neck of the resonator. The bottom of the bore 35 is then closed by a plug 35c, which may be secured in place by peening as at 35e. The Helmholtz resonator in this form is of advantage in view of its simple nature and the ease with which it may be formed in a conventional piston structure.

Figure 19 shows still another piston mounted Helmholtz resonator type of absorber. Here, the piston top 36 is formed with a bore 36a extending downwardly from its top surface, and an enlarged counterbore 36b extending upwardly from below. The Helmholtz resonator structure, indicated generally by numeral 37, includes a cylindrical base portion 37a, received in counterbore 36b, and secured in position by peening as at 37b. Extending upwardly from base portion 37a is a cylindrical chamber 37c, enclosing a resonator chamber 37d. As shown, the side walls of the chamber 37c are annularly spaced from the bore 36a, and the lower ends of the side walls are formed with a series of ports 37e, which ports constitute the mouth of the resonator. Enclosed within the chamber 37c is a steel ball 38. The resonator 37 functions in the usual manner to attenuate detonation frequency waves of frequency to which it is resonant. The chamber being exposed to the flame, carbon accumulation therewithin is minimized. In addition, the steel ball 38 is free to rattle about inside the chamber owing to the reciprocating motion of the piston, and this rattling ball has a scouring action on the inside surfaces of the chamber, tending to prevent carbon accumulation. In passing, it may be noted that the attenuator 37 is one of several disclosed types which has been arranged in sound transmissive communication with the combustion chamber by being positioned virtually inside the chamber.

Figure 20 shows a resonant membrane absorber, in combination with a resonant absorber cavity. In this case, resonant absorber cavities 39, illustratively Helmholtz resonators, although pipe resonators would serve as well, are formed in combustion chamber wall 22c, and are covered by relatively thin flexible or elastic plates 39a which are fastened to the combustion chamber wall by any suitable means such as welding. The detonation wave damping effect of the cavity is preserved, since the cavity and flexible plate combination present a sound wave reflecting means tuned to a predetermined resonant frequency matching the detonation frequency to be attenuated. The vibratory membrane or plate also absorbs energy from the sound wave, and by tuning it, in combination with any cavity which might be in back, to be resonant to the detonation frequency, its vibration amplitude becomes substantial, and a substantial amount of the acoustic energy may thus be absorbed, and the detonation wave reduced accordingly. This effect is of course over and above that owing to the cavity behind it. The plate 39a also serves the important function of preventing carbon deposit within the cavity. The attenuator of Figure 20 is illustrative of a type wherein a cavity is arranged in acoustic communication with the combustion chamber through a solid elastic member. The expression acoustic communication thus refers not only to transmission through a gas, but through any elastic media which will transmit the wave.

In Figure 21 is shown a valve-in-head engine of modern type, having a water cooled block 40, water cooled head 41 fastened to block 40, and a piston 42 reciprocable in cylinder 43 within block 40. Head 41 comprises a generally domed or hemispherical combustion chamber wall 44 defining a combustion chamber 45 over piston 42. In the center of head wall 44 is a threaded port 46 to receive spark plug 47. Intake and exhaust valves open to combustion chamber 45 through wall 43, an exhaust valve being indicated at 48, and the intake valve (not shown) being understood to be located symmetrically with respect to the exhaust valve, forwardly of the plane of the drawing, as will be understood. Details of operating mechanism for these valves may be of a type known in the art and not requiring further illustration or description herein.

Formed in the generally hemispherical wall 44 of engine head 41, somewhat below spark plug port 46, and between the intake and exhaust valves, are threaded ports 49 and 50 to receive acoustic attenuators.

An illustrative acoustic attenuator 51, mounted in port 49, has a tubular housing 52 formed at one end with a reduced externally screwthreaded tubular stem 53 which is screwed into port 49. The reduction in diameter to form stem 53 affords an upwardly facing internal annular shoulder 54 in body 52, on which is seated a porous body or wall 55. In the present illustrative embodiment, this member 55 is in the physical form of a disk-like wall or plug 55, those external diameter is such as to be accommodated with a free sliding fit within the internal bore 56 of body 52. The upper or rearward end of bore 56 is screwthreaded to receive screwheaded closure plug 58, and a resonator cavity 59 is formed within body 52 between the porous body 55 and said closure plug 58. Preferably, the space between body 55 and plug 58 is made sufficient to accommodate an inverted ceramic cup 60, which is mounted on body 55, and whose lower concave surface 61, together with the upper surface of the body 55, defines the resonator cavity 59.

Various materials have been found suitable for the purpose of the porous body 55. For example, I have found that fiber glass confined between screens is a very suitable material, having highly desirable acoustic absorber characteristics. I have also found that sintered powdered metal, such as used to form a common type of oil-impregnated bearings, is quite satisfactory. In making such a porous body, the powdered metal is first compressed under high pressure, and then fired until the particles partially fuse and weld together. The degree of porosity can be varied by grain or particle size, and can thus readily be selected to give optimum performance in accordance with the teachings of the invention. I have also found porous ceramics, as well as certain graphite granular compositions, to be quite satisfactory if used in sufficient area. Such a body or wall has tortuous tubes or passageways, often of nearly capillary-like dimensions, extending entirely or partially through it between its opposite faces. These tubes or passageways may comprise inter-communicating pores, cells, crevices, or the type of intercommunicating air spaces formed in such a material as a body of fiber glass or the like, which may be 90% air space. The passageways, characteristically tortuous in nature, are open for fluid flow through the wall or body, but are sufficiently constructed to cause substantial friction losses of a viscous type.

One such attenuator as thus described, connected to the combustion chamber, has a substantial attenuative effect on detonation, but an additional attenuator may also be connected into the head through the second port 50. This additional attenuator may be of the same type as the one already described, though I have here shown a modified type, having certain added features of advantage, as will be described in detail hereinafter.

As a further means for suppressing detonation sound waves within the combustion chamber of the engine of Figure 21, a porous pad, wall or body 67 is mounted on the top end of piston 42, and may also be of sintered, powdered metal. Such a pad may conventionally be silver soldered to the piston. Also, the top of the piston, beneath the pad 67, is shown to be formed with resonant absorber cavities 68, here shown to consist of approximately quarter-wave cylindrical holes bored into the top of the piston and opening directly to the bottom surface of pad 67. These cylindrical absorbent cavities or spoilers 68 are drilled to depths to be resonant to one or more detonation frequency bands as described in connection with the engine of Figure 9.

The tortuous passages in the porous wall or body 55 in the attenuator 51 and in the porous pad 67 mounted on the piston introduce substantial frictional resistance of a viscous type to the passage of sound waves. The porous wall 55 in combination with the resonator cavity 59 has the ability to attenuate a wide frequency range, as well as a narrow band of destructive detonation frequencies to which the resonator cavity is designed to be selectively resonant. The porous pad 67 mounted atop the piston further attenuates a wide frequency band; and the cavities 68 below the pad 67 give peaked response characteristics coinciding with one or more relatively narrow bands of destructive detonation frequencies.

Broadly considered, the main benefit of the porous wall used across the neck of a resonant absorber is to materially reduce the "Q" of the resonator, flattening the peak of the response curve, and therefore increasing the frequency band width which will be attenuated. As earlier explained, the resonant absorber standing alone, such as either of the Helmholtz type or the pipe resonator type, has a relatively high "Q," and while this "Q" factor is subject to some control in the design of the resonator, the attenuative response of such a device is somewhat restricted in band width. The use of the porous wall across the neck of such a resonator greatly increases the band width to which the attenuator will respond. The resonator in this case is designed to have its resonance peak at the detonation frequency which is to be attenuated, and by virtue of the broadening of the wave band resulting from use of the porous wall, not only that frequency, but other frequencies for a considerable range on either side thereof will be materially attenuated. This is of particular advantage where the total band width of a resonance peak is fairly large, and a sharp tuning device would not remove the entire peak. Also, the attenuator may sometimes be designed in this form to have a principal attenuation response to a predominant detonation frequency, but to be also responsive to a useful degree to some other detonation frequency. Thus such a broad tuning device as here described may have frequency response to two or more separated detonation frequencies. Of course, as already explained, the tortuous passageways extending into it through the porous wall have an attenuative effect of their own, but this is not too important in this type of attenuator, since the attenuative effect of either the Helmholtz resonator or the pipe resonator is usually sufficient without such aid. The broadening of the response band is, however, often a useful feature.

The invention may also be practiced by using the porous wall for its ability to absorb sound waves even without the use of the resonator cavities behind them. For example, the porous pad 67 on top of the piston 42 may be used without the resonator cavities 68. The porous wall has a frequency response characteristic of its own, even without the resonant cavity behind it, but its "Q" (sharpness of tuning) is very low and the device in this form is responsive to a very wide frequency band. Nevertheless, the response characteristic of the attenuator in this form cannot be entirely disregarded, and it is desirable to make preliminary tests, according to known acoustical techniques, to assure that the pad used will have an attenuative response to the sound wave frequencies accompanying the detonation that occurs within the engine. The fine pores or passageways into and through the porous wall offer very great viscous friction to the sound waves which are incident thereon, and if the walls are made of sufficient thickness relative to the wavelength, virtually 100% of the incident wave energy could be thus absorbed. In a practical engine installation, where the thickness of the porous wall is somewhat restricted, something less than 100% absorption will be gained, but the gain is nevertheless substantial and important. When used without a resonator, I prefer to have the thickness of the porous wall not much less than one-eighth wavelength of the detonation frequency to be suppressed in order to assure a wave transmission path of sufficient length through the porous material to assure adequate attenuation.

Also, in the engine of Figure 21, the invention can be practiced by omitting the porous wall and relying alone on the resonator cavities. Thus, the porous pad 67 atop the piston is omitted, and reliance placed on the resonator cavities 68. This is particularly possible where the pressure peaks at resonant frequencies do not span wide frequency bands, as is the case with some chambers. For such cases, the cavities 68 can easily be designed with sufficiently broad response to adequately cover the resonant peaks.

While a porous wall or body as described may serve as an attenuator without the use of resonant cavities in combination therewith, and the resonant cavities may be used without the porous wall, I prefer the use of the combination device. First, the resonator cavities in back of the porous wall may be designed to be resonant at the most offending detonation frequencies, and by using more than one of the resonator cavities, each can be designed to be resonant to a particular detonation frequency. Second, the resonator cavities are effective at the lower wave frequencies where the effectiveness of loss owing to viscosity alone is diminished. Further, by using resonator cavities in back of the porous wall, the wall thickness may be considerably less for a given degree of attenuation than by using the porous wall alone. Finally, the resonator tends to cause maximum oscillatory motion of the gas particles in the porous material, thus further increasing the effectiveness of the attenuator.

It should be pointed out that in practice, as well as in theory, the passages into and through the porous plug can be made too small in cross section for effective attenuation. This point is reached when the passages are so narrow that incident waves are materially reflected by the surface of the plug owing to the high acoustic impedance of the passages. It should be evident that no sharp dividing line may be found, and in practice, plugs of some varying degrees of porosity will give different proportions of the effects here explained. In general, I prefer that the porosity be a maximum in volume (within the limits of gas-trapping as explained following) as can be accomplished by using a material having a large number of fine filaments. An understanding of the phenomena involved as given herein will, in practice, permit selection of materials having the degree of porosity best yielding the effects desired for any given situation. In general, I prefer a material such as fiber glass, though I have found that sintered powdered metal can be fabricated with the necessary porosity for the desired acoustic effect. However, the gas volume in the attenuator should be limited so that much of the unburned gases will not be trapped therein until too late in the cycle for efficient combustion. The denser grades of fiber glass, or the more porous sintered metals, are desirable.

The second attenuator illustrated in Figure 21, and designated generally by numeral 65, has a tubular body 70 formed at one end with a screwthreaded stem 71 screwed into port 50, and the device in this instance is equipped with a purging system to further prevent accumulation within the cavity of carbonaceous residue from the combustion chamber. Screwed into the upper or outer end of the body 70 is a closure wall 72 provided with a central port 73 whose lower end forms a seat for a conical valve 74 on the lower end of valve stem 75 extending upwardly through port 73, a coil spring 76 around said stem placed between wall 72 and a head on the valve stem serving to keep the valve normally closed. A spacer ring 78 between closure 72 and porous wall 80 seated in the lower end of body 70 holds said porous wall in position and defines the resonant cavity 81. This spacer ring 78 may be a ceramic of poor heat conducting properties which will acquire a high temperature and so help reduce carbonaceous residue formation in the chamber 81.

In normal non-supercharged engines, the combustion chamber goes below atmospheric pressure during the intake stroke. Since the Helmholtz cavity 81 is in communication with the combustion chamber through the porous wall 80, its pressure is responsive to combustion chamber pressure to the extent that the check valve 74 opens during the intake stroke of the engine and introduces a small amount of air into the cavity 81. At engine temperatures, only a small amount of excess air in said cavity is needed to oxidize and remove the carbonaceous matter that strays into said cavity. This air is also drawn through the porous wall 80, and thus serves to cool said wall. Additional cooling of said wall 80 results from heat conduction to the adjacent cooling jacket 44a of the engine head. Heat conduction is improved by the use of a copper gasket at 80a.

It is generally desirable to filter the air intake into cavity 81, and the attenuator 65 of Figure 21 includes a felt cylinder 85 for that purpose installed in a channel in the top of closure plug 72 and supported at the top by holder plate 87 secured in position by spacer rods 88 as indicated.

The attenuator 65 is effective to a substantial degree even without the resonant cavity 81, and Figure 22 shows a modification wherein the resonator cavity is omitted and the porous plug or wall 90 is made of even greater thickness, extending in this instance all the way from the bottom shoulder 91 inside tubular housing 92 to the closure plug 93. It will be understood that the device of Figure 22 is installed in the engine by screwing its threaded stem 94 into one of the engine ports 49 or 50 in place of one of the devices shown in Figure 21. Here the porous plug attenuates a wide range of detonation wave frequencies generated by the engine. The sound wave attenuation in this instance arises from diffusion and from the viscous friction caused by the narrow passageways, pores and crevices with which the porous plug is honeycombed. In some engines I find it important to have the area of the solid porous plug 90 of Figure 22 at least equal to approximately 5% of the cross-sectional area of the combustion chamber. This form of the invention as well as the attenuator 65 benefits particularly from the fact that the attenuator is in the form of a wave guide extending outside the main inner surfaces of the combustion chamber, since by this arrangement the length of the path of travel through the attenuator can be materially increased. As has been earlier mentioned, I find it desirable to provide a path of travel at least of the order of one-eighth wavelength through the porous type of attenuator so as to assure satisfactory attenuation.

In Figure 23 I have shown another type of auxiliary sound wave attenuator adapted to be screwed into one of the threaded ports 49 or 50 in the head of the engine of Figure 21. Tubular body 100 contains a conical chamber wall 101, perforated throughout its length, as at 102, and formed at its large end with an end closure wall 103 having a threaded neck 104 to be screwed into the combustion chamber port. The large end of the chamber wall 101 is press-fitted inside the body 100, and its small end has a stem 105 projecting through a center bored removable end closure cap 106 for the body, the extremity of stem 105 being threaded to receive nut 107 by which cap 106 is secured in position. Body 100, in back of perforated wall 101, is packed with a porous body 108 comprised of a fibrous sound wave absorptive material such as fiber glass, tungsten fibers, copper fibers, silica fibers, or the like. A screen 109 is used around said wall 101 to confine the fibrous material against loss through the perforations. Sound waves entering the housing from the combustion chamber communicate with the absorptive body of material by entering through the neck 104 and passing through wall perforations 102. The wave front traveling down the conical wall 101 and out through its perforations encounters a gradually increasing thickness of the absorptive material 108, and this annular "wedge" effect tends toward progressive absorption of the wave, avoiding sharp increases in impedance such as might cause wave reflections back out of the device. Such a sound wave absorber is again predominantly responsive to a given wave frequency but the response curve is relatively flat, and the attenuator in this form is responsive to a wide frequency band. The fibrous type of material here used for sound wave absorption is found in practice to be particularly effective in such a device.

Figure 24 shows another modified attenuator, of the type adapted to be screwed into a combustion chamber port, such as the ports 49 or 50 of Figure 21. Tubular body 110 has a reduced screw-threaded tubular stem 111, adapted to be screwed into the combustion chamber port, and has, located somewhat towards its upper end, an internal annular flange 112 affording an upwardly facing annular shoulder for the support of the external annular flange 113 formed at the top of porous plug 114, the latter extending downwardly below flange 112 with substantial clearance from the inner surfaces of the body 110. Mounted on the lower end portion of plug 114 is a nose cap 115 enclosing a resonator cavity space 116 adjacent the bottom end of plug 114. This nose cap 115 is also adequately spaced from the inner surfaces of body 110, so as to permit unrestricted passage of sound waves from the combustion chamber of the engine up through the clearance space 118 to the exposed cylindrical side wall 119 of plug 114. The fundamental operation is the same as described for attenuator 51 of Figure 21, the plug 114 presenting a large plurality of fine passages or crevices, some of which furnish communication to the resonator cavity space 116. The distinctive feature of the instant embodiment is the presentation of the resonator cavity defining wall 115 to the heat of the combustion chamber, whereby said cavity is maintained at a high temperature sufficient to oxidize carbonaceous residue tending to accumulate within the cavity.

Figure 25 shows still another embodiment of auxiliary attenuator device adapted to be screwed into a combustion chamber port. The device in this instance incorporates a spark plug, so that the device in this form may be used with conventional engines by simply screwing it into the conventional spark plug port. Thus, into the spark plug port is screwed the externally threaded tubular stem 121 of a cylindrical porous body 122, the latter having cylindrical interior cavity 123 whose upper end is internally screwthreaded to receive conventional spark plug 124. The body 122 is here shown to be enclosed within a metal closure shell 125, and is preferably formed, inside said shell, with an external circumferential channel 126 providing a resonator cavity space. I have thus interposed a porous body between the engine and the spark plug, the device serving as a spark plug adapter. The combustion chamber space immediately adjacent the spark plug is believed to be an origin point for radial wave forms of detonation disturbances in engines like that shown in Figure 21, and by having this space immediately adjacent porous wall 122, the destructive detonation sound waves are largely absorbed at their source. By employing the optional but preferred resonator cavity space 126, the device is made more frequency selective, and by choice of proper design constants for frequency response, the particular detonation frequency causing the most difficulty is thereby selectively attenuated. One optional arrangement is to provide stem 121 of solid material, for mechanical strength, and then use porous material only for member 122.

In Figure 26 I have shown an engine where a sound wave attenuator has been incorporated as a part of the wall structure of the combustion chamber. The engine in this instance is a valve-in-head type having a water cooled block 130, water cooled head 131 secured thereto, and piston 132 reciprocable in cylinder 133 within the block. A spark plug 134 is mounted in head 131, and intake and exhaust valves are shown at 135 and 136, respectively. A combustion chamber 137 is provided over cylinder 133 and is in the approximate form of an exponential horn whose mouth or bell joins block 130 at the margin of cylinder 133. The lower portion of the horn-shaped combustion chamber is defined by an inside horn-shaped head wall 140, and the upper portion thereof by a suitable wall contained within a presently described chamber extension 141 attached to the head. The intake and exhaust valves control fuel mixture intake and exhaust gas passages 142 and 143 opening through wall 140 into chamber 137. The stems 144 and 145 of the intake and exhaust valves are reciprocable in valve guides 148 mounted in the head and are spring actuated to closed position by springs 149 acting between washers on the ends of the stems and seats 151 on head 131. The valves are operated in timed sequence with respect to the stroke of piston 132 by any suitable valve-actuating mechanism, including rockers 152 and push rods 153, together with suitable cam shafts, the details of which need not be shown nor described herein.

The inner wall 140 of the combustion chamber extends upwardly from a juncture with cylinder 133 in the form of an exponential horn to a tubular, internally threaded boss 161, and the previously mentioned combustion chamber extension 141 has a hollow externally screwthreaded stem 164, which is screwed into boss 161. This extension 141 contains a chamber or passageway 166 whose defining walls form an exponential-horn-continuation of the exponential horn-shaped interior surface of main combustion chamber wall 140. The chamber 137 thus consists in reality of the space surrounded by wall 140, together with the space or chamber 166 enclosed within combustion chamber extension 141. This combustion chamber 137, as already explained, is essentially in the form of an exponential horn, the mouth of which is coextensive with cylinder 133, and the throat of which is contained within the extension 141. The side walls of the horn are made substantially exponential from the mouth to a plane 170 where the throat has been reduced to a relatively small diameter, for example, about a millimeter, and above plane 170, the throat communicates with a sound wave attenuator element which in this instance consists of a straight uniform diameter bore 171 of a few inches in length, and of a small diameter, typically of the order of a millimeter. The extension 141 is preferably air cooled, and in the present illustrative embodiment it is made generally cylindrical in form, and provided with cooling fins 172. However, in some cases, such as with engines normally operating at light load, it may be found desirable to permit the extension 141 to run relatively hot so as to burn out or prevent the formation of carbon deposits and keep the passageway 171 clean. For such purposes, the cooling fins are reduced in number or area, or entirely omitted. In passing it may be noted that I have found some additional attenuating effects when the temperature is not uniform along the horn and attenuation passage. When the engine is in operation, there is a natural temperature gradient along the horn extension 141 which gives this effect. For ease of installation, the upper end of the cylindrical extension 141 is preferably formed with a hexagonal head 174 adapted to be engaged by a wrench.

In the present embodiment, the top of piston 132 is formed with a hump 175, shaped to be receivable inside the mouth of the horn, and it will be understood that this hump serves to reduce the clearance volume of the combustion chamber. This hump may be formed with pockets 176 to receive the intake and exhaust valves, so as to avoid interference between said parts in the operation of the engine. Also, if desired, the hump 175 may be formed of a body of porous material having sound absorbent characteristics, as earlier described.

In operation, a detonation pressure wave initiated within the combustion chamber travels up the exponential horn to the narrow throat portion thereof with ever increasing energy density, finally encountering and entering the narrow passageway 171, which furnishes an attenuative termination for the horn. An enforced increase in the energy density of a sound wave, produced as by causing the wave to travel through a gradually constricted guide, creates a condition favorable for attenuation of the wave. In my combustion chamber, the energy density of any given detonation pressure wave traveling up the horn is very greatly increased by the time the wave passes the plane 170. The high energy density wave then travels the length of the attenuator by the fine passageway 171, wherein the pressure wave energy is dissipated by conversion into heat. The pressure wave, with its energy density thus greatly amplified, acquires a very steep wave front as it traverses the fine passageway 171, and conversion to this steep wave front is accompanied by creation of high frequency wave components, which are conducive to still greater wave attenuation. Using a substantially exponential horn, with such a fine passageway joined smoothly at its throat, and under combustion chamber conditions, no reflected wave of any moment or importance travels back through the horn toward its mouth.

It should also be noted that the exponential horn of Figure 26, which is shown as having its throat coupled to an attenuator consisting of a fine straight-sided bore 171, might instead be continued past the plane 170 on an exponential curve, in which case the very fine portion of the bore beyond the plane 170, where the transverse dimension of the bore becomes of the order of a millimeter or less, becomes the attenuator. In this case the major length of the horn functions as a constricting wave guide to increase the energy density of the wave, and also as a coupling means between the detonation wave as received and an acoustic wave attenuator element in which the wave, after increase of its energy density, is largely destroyed. The wave attenuator element might be any acoustic device capable of attenuating or destroying a high energy wave, as a fine straight bore or tube, the narrow or fine terminal portion of the throat of an exponential horn, or various other devices, some of which will be indicated hereinafter. The term "absorber" can be applied to any of these devices which absorb wave or oscillatory energy, including resonant absorbers, porous absorbers, narrow passages, membrane absorbers, etc.

When considering the type of anechoic chamber which uses any of the known types of acoustic couplers, typified by the exponential horn, it is important to recognize that certain acoustic laws must be followed to a substantial degree in order to prevent undesirable wave reflections back into the chamber. As already described, the exponential type horn picks up the wave from the combustion chamber and directs it down the contracting horn-shaped "wave guide," and then delivers the wave, with its energy density greatly amplified, to the attenuative termination connected to the throat of the horn. The horn actually functions primarily as a coupler to the attenuating device, being somewhat equivalent to a transformer in an electric circuit.

As is well known, a true exponential horn doubles its cross-sectional area for equal increments of length. Of course, in so far as the general exponential law goes, the equal increments of length are not fixed at any specific value. With a relatively short increment of length for each doubling of area, the horn will be relatively short, and is said to have a high expansion ratio; and for a relatively long increment of length, the horn is relatively long, and is said to have a relatively low expansion ratio. The ability of the exponential horn to respond to, or accept without reflection, waves of any given frequency range is intimately related to this expansion ratio, and it accordingly becomes desirable to design the exponential curve with account taken for the frequency or wavelength of the detonation waves which are to be attenuated. I have found the following equation to be a good guide in designing wave guides for anechoic combustion chambers: $S = S_0 e^{bx}$ in which $S$ is the cross-sectional area (square inches) at any station of distance $x$ (inches) from the small end where the area is $S_0$. The constant $e$ is the well known base for natural exponentials. The constant $b$ determines the longest wavelength (in inches) which the horn will accept and transmit down its throat without reflection back. The horn is thus a non-reflective wave guide for all frequencies above that determined by the constant $b$. I have found this longest wave to be a function of each particular combustion chamber design, and in many cases a function also of combustion chamber size. A desirable value for the constant $b$ for a five inch equivalent wave length (corresponding to the lowest characteristic detonation frequency I have discovered in a three inch bore engine combustion chamber) is 1.20. Increasing the wavelength (reducing the frequency) requires a proportionate decrease in the exponential constant $b$ in order to provide a more gradual taper (lower expansion ratio) so that the horn will accept the longer wave without reflection. A horn with an exponent constant of 1.20 will have virtually a cutoff (or no response) for a ten inch equivalent wavelength. Thus, in general, the less the rate of flare (the smaller the value of the exponent $b$) the greater the wavelength, and the lower the wave frequency which can be suppressed by the horn and its attenuator.

It may also be noted that whereas a combustion chamber configured as a true exponential horn forms a wave guide capable of compressing or receiving a wave into a small volume and delivering it to an attenuator, substantially without reflection, considerable deviation from a true exponential curve is, in practice, permissible without loss of the substantial benefits of the invention. A slightly modified shape which is ideal in practice is a catenoidal horn, which has the added advantage that the curve of the horn becomes parallel to its longitudinal axis at the throat, and hence joins the fine attenuator passage without the slightest break or discontinuity in curvature. Other related shapes are also feasible, and in general, the broad requirement is that the horn be of the usual flared type found in acoustic practice. Also, in those cases in which the horn together with the attenuation passage results in an overly-tall structure, the throat of the horn and/or the fine attenuation passage may be folded, curled, or bent over, as is common in loud-speaker practice. Attention is called to the fact that by having the horn type wave guide extended outside the main inside wall surfaces or confines of the combustion chamber, opportunity is afforded for the provision of a desirably long path of wave travel through a desirably low taper ratio horn and a long attenuator.

The two valves 135 and 136 of the engine of Figure 26 are shown as desirably formed with flared horn-shaped passageways 180 and 181, respectively, the mouths of these passageways opening into main combustion chamber 137, and their throats extending upwardly through the stem of the valve along the longitudinal axis thereof. The throat of the passageway 180 terminates at a plane 182 and joins at this point with a fine uniform diameter bore 183, of a typical diameter of a millimeter. This horn also accepts detonation sound waves, increasing their energy density, and attenuating their amplitude in the bore 183. The other valve 136 has its horn-shaped passage 181 terminated so as to have a substantially shorter throat, which is packed with a body 186 of some suitable sound wave absorptive or attenuative material, such as Pyrex fiber glass, tungsten wool, or the like. This body of material may be held in place by means of a screen 187 and a cross pin 188, and has sound wave attenuative characteristics sufficient to make unnecessary the provision of the fine bore described in connection with the valve 135.

Figure 27 shows a combustion chamber extension 190 which may be substituted for the combustion chamber extension 141 of the engine of Figure 26, and is accordingly to be considered in connection with the engine of Figure 26. This chamber extension 190 has features similar to the chamber 141 of Figure 26, but its uniform diameter bore 171a which joins with the exponential throat of the horn-shaped combustion chamber is of substantially increased diameter, and the whole device accordingly becomes of substantially reduced length. This bore 171a is instead packed with a body 191 of suitable sound wave absorptive or attenuative material having fine gas passageways into and through which the sound waves are forced to travel and wherein the high energy density waves are readily and effectively attenuated and absorbed. The body of material 191 may be held in place by means of a screen 193 and a cross pin 194. As typical examples, but without intention of limiting the invention, the body 191 may be Pyrex fiber glass, or tungsten wool, such substances being able to withstand the high combustion temperature present, and at the same time having the necessary sound wave absorptive properties.

In Figure 28 I have shown an auxiliary attachment device, capable of attachment to the combustion chamber of an engine, and incorporating a wave guide and attenuator of the exponential horn type. A cylindrical housing 200, formed preferably with external cooling fins 201, has at one end a reduced and threaded neck portion 202, adapted, for example, to be screwed into the spark plug port in the head of a conventional engine, or into a special port provided for the purpose, such as one of the ports 49 or 50 in the engine of Figure 21. Received through the upper end of cylindrical housing 200 is a body 204 whose longitudinal curvature is such as to form between its exterior surface and the interior surface of housing 200 a longitudinal annular passageway or wave guide having a cross-sectional area which diminishes in an upward direction in the manner of an exponential or other flared type horn. In other words, the annular chamber space 205 is the equivalent of the space inside such a horn, and functions acoustically in the manner of the horn-shaped chamber previously described. Preferably, the body 204 is formed substantially on an exponential curve up to plane 206, where the clearance passage 207 between the body 204 and the wall of housing 200 is of the order of from a few thousandths of an inch to a millimeter or thereabouts. The clearance passage extends at this dimension from the plane 206 to a point where the body 204 has a screw-threaded section 208 screwed into the internally screw-threaded portion 209 of the upper end of the housing.

The operation of the sound wave attenuator of Figure 28 will be understood without further description, since the functions are the same as with the horn types previously discussed. Suffice it to say that detonation generation sound waves entering the chamber 205 through the neck 202 experience great increase in energy density in moving up the exponential wave guide passage 205, and the sound wave energy is then largely dissipated and converted into heat within the narrow clearance passage above the plane 206.

As an optional feature, the body 204 of Figure 28 is formed with a longitudinal bore 212 extending from its upper end to an annular seat 213, and extending downwardly through said seat is a threaded socket 214 for a spark plug 215, the downwardly projecting insulator portion of which is tightly received within an aperture 216 opening through the lower end of the body 204. The electrode tip of the spark plug is spaced from a grounded electrode rod 218 projecting from the side of housing 200. Thus the one auxiliary device combines a detonation wave attenuating means and a spark plug.

A modified attenuator of the horn type is shown in Figure 29, and comprises a housing 220 enclosing an exponential horn-shaped chamber or wave guide 221 whose throat portion continues to a small diameter of a millimeter or less, and finally terminates in an orifice 222 opening to atmosphere. The mouth or bell of the horn-shaped chamber is of somewhat larger diameter than the opening through the threaded neck portion 223, and the opening from the large end of the horn-shaped chamber into the combustion chamber of the engine is thus somewhat constricted. The mouth of the horn in this case is of greater diameter than the port in the top of the engine head. In this way the maximum area of acoustical wave front received from the combustion chamber is increased, the intervening constriction being of little consequence acoustically since it is short relative to a wavelength of the sound waves to be attenuated. I thus gain the benefit of a larger horn than would otherwise be permitted by the size of the port through the engine head.

The opening of the throat of the exponential chamber through the orifice 222 to atmosphere results in dissipation of sound wave energy, and is thus one form of acoustic wave attenuator which may be employed at the terminal portion of the horn. The orifice 222 and the passageway communicating therewith are of sufficiently fine bore that no material loss of engine compression can result, but a substantial quantity of acoustic wave energy can be dissipated therethrough, particularly where the sound wave energy density has been elevated to a high value. Actually, the small volume high velocity outflow from the orifice tends to help attenuation of sound waves traveling down the fine portion of the throat. It will be evident that the extension of the throat of the horn-shaped passage through the end of the device so as to open to atmosphere is a feature that may be employed with any of the horn type embodiments of the invention.

Figure 30 shows a further auxiliary horn type wave attenuator 230, having threaded tubular portion 231 adapted to engage in a threaded engine port. This device contains horn-shaped passage 232 opening through the tubular portion 231 to the engine combustion chamber. The fine throat portion 233 of the passage 232 opens into an enlarged surge chamber 234, which, in the operation of the engine, accepts and receives a substantial flow of combustion gases through the throat 233 and the horn-shaped passage 232 during each engine explosion. Following the engine explosion, the gases compressed into this surge chamber return to the combustion chamber. This flow cycle at engine frequency (much lower than the sonic detonation frequency) is of large amplitude and tends to keep the fine passage 233 cleaned and open. This surge type of flow into and then from the chamber 234 occurs at supersonic velocity, because of the high magnitude of ordinary explosion frequency, and its effect is believed to aid in the attenuation of the superimposed detonation waves.

Figures 31 to 33 show a further modified engine having a detonation wave attenuator of the horn type. Water cooled engine block 250 has cylinder 251 fitted with piston 252; and water cooled head 253, secured to block 250, is fitted with intake and exhaust poppet valves, such as indicated at 254, operated by usual mechanism such as indicated at 255, and has, to one side of cylinder 251, a threaded port 256 for spark plug 257. As will be seen, the highest portion of the combustion chamber 258 is adjacent the spark plug, and this portion of the combustion chamber, directly over the periphery of the piston, is extended upwardly into a horn type attenuator generally designated by the numeral 260. This attenuator 260 has a plug or body part 261 generally arcuate shaped in section (see Figure 33) and received in a corresponding slot 262 extending vertically through head 253. At the top, the body 261 has a mounting flange 264, secured onto the head by means of screws 265. A horn type passage 270 is formed in this body 261, its mouth opening downwardly into the top of the combustion chamber, over the rim of the piston, and adjacent spark plug 256. The horn 270 extends upwardly above mounting flange 264 into an extension 271, which thus contains the throat of the horn. To the upper end of this extension 271 is connected one end of an attenuator tube 272, which for convenience is coiled around extension 271, as indicated. The tube 272 is sufficiently long, typically 12 inches, so that the wave is conducted therealong until it is almost completely dissipated.

As will be seen, the horn-shaped passage in this design is not round in cross-section, but considerably flattened, and bent into an arc, so as to overlie an arcuate shaped marginal or rim portion of the piston. Its angular extent is approximately 90°, as best illustrated in Figure 33, and it accordingly is of sufficient angular extent to reach the full distance between the pressure anti-node area and the velocity antinode area of the fundamental acoustic wave pattern, illustrated in Figure 1. To increase the structural strength of the device, and to prevent lateral "sloshing" of the wave in the mouth of the horn, the chamber 270 may be braced as by means of webs 274. This form is especially effective when an odd multiple of pressure antinodes exists at its mouth; and it is also effective for the radial modes.

As has previously been described, the pressure antinodes of the several acoustic wave patterns discovered inside a combustion chamber have been found to be located over peripheral portions of the piston, as diagrammed in Figures 1 to 4. A multiple horn type attenuator assembly extending for as much as 90° of angle over the piston, at a location near the periphery thereof, has a material attenuative effect on all of the acoustic patterns diagrammed in Figures 1 to 4. Clearly, the first and third higher modes (Figures 2 and 4) are taken care of, since at least one pressure antinode, and possibly two, are bound to be within the confines of the mouth of the horn. Similarly, the horn assembly occupies a substantial extent of the outside pressure antinode region for the radial mode of Figure 3, and substantial attenuation of that mode is assured. With regard to the fundamental mode (Figure 1), one end or the other of the 90° extending horn mouth will either coincide, or nearly coincide, with a pressure antinode region, or both will be sufficiently close to the two pressure antinode regions to assure suppression of the fundamental wave.

The embodiment of Figures 34 and 35 takes care, with a simple device, of all of the specific acoustic wave patterns which have been diagrammed in Figures 1 to 4.

Figures 34 and 35 show a piston provided with horn type attenuators. A piston 280 having a head 281 beveled at the top, as at 282, has formed in said head 281 a plurality of horn type passages 283, 284, and 285, the mouths of which open through the beveled face 282 at substantially 45° spacings from one another. The mouths of the horns are thus located over a peripheral region of the piston, where the pressure antinode zones are known to exist, and by having two of the horn mouths at 90° spacing, and a third midway between the first two, there is assurance of covering the several known acoustic modes, as will be understood from what has earlier been said. The horns 283, 284, 285 extend generally horizontally through the piston head, but at different levels, so as not to intersect one another, as clearly shown in the drawings. Various kinds of attenuative terminations may be provided for the horns, but I have here shown a simple form in which the throat of each horn opens through the beveled surface of the piston head by way of a fine orifice 286. Such an attenuator has earlier been described, and its operation need not be repeated beyond to note that the attenuative function is not interfered with by reason of opening of the orifice back into the combustion chamber. It will also be seen that by having the passage open at both ends, it becomes also a half-wave pipe, and accordingly functions, for a certain wave frequency band, as a resonant absorber of the general type of that disclosed in Figs. 12 and 13. Acoustic wave energy dissipation for this band results from gas turbulence within the passage.

Figures 36 and 37 show a group of three horn type attenuators 290 formed in a wall structure 291 depending from the head of a piston 292. The mouths of the horns again open through a peripheral region of the piston, and the three horn mouths are located, two at 90° spacing from one another, and one midway between. Each of the horn-shaped attenuators 290 has at its throat end a fine attenuator passage 293 in which the high energy density waves are dissipated. A fourth horn type attenuator 294 has its mouth opening at the center of the piston, and extends downwardly through a body 295 depending from the head structure of the piston. This horn-shaped attenuator 294, somewhat smaller than the attenuators 290, has also a fine attenuator bore 296 at its throat, and its mouth, being located at the center of the piston, coincides with the pressure antinode region of the radial mode acoustic pattern diagrammed in Figure 3.

Figure 38 shows a modification of Figures 36 and 37, wherein the intervening attenuator 290 of Figure 36 is relocated in a position 135° from each of the other two. Acoustically, this arrangement has the same effect as that of Figure 36, since the pressure antinode regions always appear in pairs located diametrically across from one another, and it does not matter which of the high impedance regions is acted upon by the attenuator. The arrangement of Figure 38 is of advantage, in the better balance of the piston mass that can be obtained therewith. These piston mounted horns can also be aided in their attenuative action by placing porous material therein, such as explained for Figure 26.

Figure 39 shows a further piston mounted horn type attenuator, wherein a bore 300, extended downwardly through a body structure 301 of the piston, receives a plug 302 formed with a horn-shaped chamber 303. The throat of the horn opens through the inner end of the plug 302, as indicated at 304, to a groove 305 which communicates with a spiral groove 306 formed around the plug 302. The groove 305 and spiral groove 306 form a long attenuated passage communicating with the throat of the horn. This device as illustrated in Figure 39 forms a convenient and easily made structure for carrying out the functions of the invention.

Figure 40 shows a piston 315 whose upper end portion is configured to provide a horn type space between it and the cylinder wall, indicated in dot-dash lines at 315a. Thus, the top end portion 316 of the piston converges in an upward direction on an exponential function curve 317, in such manner that the cross-sectional area of the annular space between the piston and cylinder wall converges downwardly from the upper end of the piston to the plane 318 in the manner of an exponential type horn. This exponential "horn" passage 319 is reduced to a relatively small transverse dimension at the plane 318, something of the order of a few thousandths of an inch to a millimeter, and there communicates with an acoustic attenuator, which may consist of any of the types of attenuator heretofore disclosed, or any equivalent. For simplicity, I have here shown an attenuator 320 in the nature of a plurality of fine grooves 321 formed in the periphery of the piston and arranged to communicate with the "throat" of the "horn."

It will be seen that detonation sound waves received by the mouth end of the "horn" passage or space 319 will travel down the same, without reflection, and will be dissipated by the attenuator 320, substantially in the manner heretofore described with other horn type forms of the invention. This form of the invention is of particular advantage, in that it may be carried into effect by a most simple modification of the piston structure. It has further advantage, in that the mouth of the "horn" 319 is located in the region of the various pressure antinode zones of the acoustic patterns known to exist in the combustion chamber. It is important to note at this point that it is common to have a taper or "stepped" diameters, particularly to maintain dimensions in spite of a temperature gradient, for the top portions of pistons. However, unless the taper complies with acoustic laws and includes an attenuative region, the effects spoken of herein will not be accomplished.

An evident modification of Figure 40 employs the space provided by grooves such as 321 in combination with a relatively straight sided and narrow annular passage 319, so as to operate as a cavity resonator, of the type of Figure 10. It is of course necessary, as always, to have the passage length and width and the volume provided by the grooves 321 in proportions which will give the necessary frequency band coverage. It is possible to increase band coverage by increasing the proportion of the grooved region, or to accomplish attenuation by proper grooves alone, wherein the extended distribution of the grooves results in a multi-orifice acoustic baffle operating as a broad band acoustic wave absorber alone in the manner completely equivalent acoustically to a porous absorber. I have found by test that a great many minor variations of configurations in this region of the upper land of the piston can be used, providing they result in proper attenuator design as taught herein.

The invention is applicable to internal combustion engines generally, wherever high compression is developed, and acoustic wave patterns can be set up, and including not only Otto cycle engines, but Diesel engines, gas turbines, jet engines of various kinds, rockets, and other combustion engines. By the expression "internal combustion engine" I mean to include all such types. The so-called "rough combustion" of Diesel engines, more and more referred to as detonation, is controllable by the invention. In this connection, it is to be understood that while the combustion chambers of Diesel engines have frequently been provided with auxiliary pockets, chambers, passages, etc., such as pre-combustion chambers, combustion ante-chambers, injector chambers, turbulence chambers, and the like, these expedients have not been of the acoustic nature described herein, and have hence not been acoustically attenuative of the pressure surges causing knocking in these engines.

Various illustrative embodiments of the invention, and procedures for its practice, have now been described and illustrated. It is to be understood, however, that these are for illustrative purposes only, and that various changes in steps, design, structure and arrangement will occur to those skilled in the art. Moreover, although this invention can best be practiced by applying expert acoustic technique as explained herein, it is possible to practice some variations hereof by simply using a "cut and try" procedure, providing, the method or apparatus finally has the acoustic features of combustion wave attenuation. The present invention therefore is not to be considered as limited to the illustrative forms or techniques here given, but to cover all such variations and modifications as may fairly be construed to fall within the spirit and scope of the appended claims.

I claim:

1. For use with an internal combustion engine having a combustion chamber and a cylinder opening into said chamber, a piston adapted for reciprocation in said cylinder, said piston having a circumscribing circumferential surface of revolution above its top piston ring groove, said surface having therein acoustic attenuation means presenting an attenuative accoustic response to a detonation wave frequency in said combustion chamber.

2. For use with an internal combustion engine having a combustion chamber and a cylinder opening into said chamber, a piston adapted for reciprocation in said cylinder, and a sound wave conduit in said piston having both ends thereof opening through the piston into said chamber, said conduit having a half-wave length for the frequency of detonation sound waves produced in said chamber by combustion.

3. For use with an internal combustion engine having a combustion chamber and a cylinder opening into said chamber, a piston adapted for reciprocation in said cylinder, and a sound wave conduit in said piston having both ends thereof opening through the piston into said chamber, said conduit having a full wave length for the frequency of detonation sound waves produced in said chamber by combustion, and said conduit opening through said piston at two different high impedance regions of said chamber.

4. For use with an internal combustion engine having a combustion chamber and a cylinder opening into said chamber, a piston adapted for reciprocation in said cylinder, the upper end portion of said piston having a surface facing but spaced from the cylinder side wall, and said piston containing acoustic attenuator means communicating with the combustion chamber through said surface, said attenuator means presenting an attenuative acoustic response to a detonation wave frequency in said combustion chamber.

5. For use with an internal combustion engine having a combustion chamber and a cylinder opening into said chamber, a piston adapted for reciprocation in said cylinder, the upper end portion of said piston having a surface facing but spaced from the cylinder side wall, a horn in said piston whose mouth opens through said surface, and an acoustic attenuator means terminating said horn, said horn and attenuator means having an attenuative response to a detonation wave frequency in said combustion chamber.

6. For use with an internal combustion engine having a combustion chamber and a cylinder opening into said chamber, a piston adapted for reciprocation in said cylinder, a horn in said piston whose mouth communicates with the combustion chamber, and whose constricted end opens to the combustion chamber and forms an acoustic attenuator means having an attenuative response to a detonation wave frequency in said combustion chamber.

7. For use with an internal combustion engine having a combustion chamber and a cylinder opening into said chamber, a piston adapted for reciprocation in said cylinder, the upper end portion of said piston having a surface facing but spaced from the cylinder side wall, a pair of acoustic attenuators in said piston opening through said surface at angular spacings of substantially 90° relative to one another measured circumferentially of the piston, said attenuators having an attenuative response for a detonation wave frequency in the combustion chamber.

8. For use with an internal combustion engine having a combustion chamber and a cylinder opening into said chamber, a piston adapted for reciprocation in said cylinder, the upper end portion of said piston having a surface facing but spaced from the cylinder side wall, a pair of acoustic attenuators in said piston opening through said surface at angular spacings of substantially 90° relative to one another measured circumferentially of the piston, another acoustic attenuator in said piston opening through said surface approximately midway between the first two attenuators, said attenuators having an attenuative response for detonation wave frequencies in the combustion chamber.

References Cited in the file of this patent

UNITED STATES PATENTS

| | | |
|---|---|---|
| 1,811,762 | Schnell | June 23, 1931 |
| 1,953,543 | Rensink | Apr. 3, 1934 |
| 2,017,744 | Bourne | Oct. 15, 1935 |
| 2,065,343 | Moore et al. | Dec. 22, 1936 |
| 2,573,536 | Bodine, Jr. | Oct. 30, 1951 |